(12) United States Patent
Shimonishi et al.

(10) Patent No.: US 9,363,182 B2
(45) Date of Patent: Jun. 7, 2016

(54) COMMUNICATION SYSTEM, CONTROL DEVICE, POLICY MANAGEMENT DEVICE, COMMUNICATION METHOD, AND PROGRAM

(75) Inventors: Hideyuki Shimonishi, Tokyo (JP); Kentaro Sonoda, Tokyo (JP); Masayuki Nakae, Tokyo (JP); Masaya Yamagata, Tokyo (JP); Yoichiro Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 13/980,029

(22) PCT Filed: Aug. 30, 2011

(86) PCT No.: PCT/JP2011/004817
§ 371 (c)(1),
(2), (4) Date: Jul. 16, 2013

(87) PCT Pub. No.: WO2012/098596
PCT Pub. Date: Jul. 26, 2012

(65) Prior Publication Data
US 2013/0322257 A1  Dec. 5, 2013

(30) Foreign Application Priority Data
Jan. 20, 2011  (JP) ................................ 2011-009817

(51) Int. Cl.
*H04L 1/00* (2006.01)
*H04L 12/26* (2006.01)
(Continued)

(52) U.S. Cl.
CPC ............ *H04L 47/12* (2013.01); *H04L 41/0893* (2013.01); *H04L 63/08* (2013.01); *H04L 63/104* (2013.01); *H04L 63/20* (2013.01); *H04L 63/0227* (2013.01)

(58) Field of Classification Search
None
See application file for complete search history.

(56) References Cited

U.S. PATENT DOCUMENTS 8,046,378 B1 * 10/2011 Zhuge et al. .................. 707/783
8,248,958 B1 *  8/2012 Tulasi et al. .................. 370/250
(Continued)

FOREIGN PATENT DOCUMENTS

JP  2004-318582 A  11/2004
JP  2006-115059 A   4/2006
(Continued)

OTHER PUBLICATIONS

International Search Report in PCT/JP2011/004817 dated Nov. 1, 2011.
(Continued)

*Primary Examiner* — Phirin Sam
(74) *Attorney, Agent, or Firm* — McGinn IP Law Group, PLLC

(57) ABSTRACT

A communication system includes a control device; a forwarding node that processes, in accordance with a processing rule set by control device, a packet transmitted from a user terminal; and a policy management device that manages communication policy and notifies the control device of communication policy that corresponds to a user for whom authentication has succeeded; a setting request transmission permitting unit that, based on notification from the policy management device, sets to a forwarding node that receives a packet from the user terminal a first processing rule causing the forwarding node to make a setting request of processing rule with regard to a packet transmitted from the user terminal; and a path control unit that determines path from user terminal to access destination and sets to forwarding node along the path the second processing rule that corresponds to the path.

20 Claims, 24 Drawing Sheets

(51) Int. Cl.
*H04L 12/801* (2013.01)
*H04L 12/24* (2006.01)
*H04L 29/06* (2006.01)

(56) References Cited

U.S. PATENT DOCUMENTS

| | | | |
|---|---|---|---|
| 8,270,310 B2 * | 9/2012 | Raleigh | G06Q 10/06375 370/252 |
| 2002/0060994 A1 * | 5/2002 | Kovacs et al. | 370/328 |
| 2004/0064575 A1 * | 4/2004 | Rasheed et al. | 709/232 |
| 2004/0213172 A1 * | 10/2004 | Myers et al. | 370/313 |
| 2007/0162749 A1 * | 7/2007 | Lim | 713/167 |
| 2008/0189769 A1 | 8/2008 | Casado et al. | |
| 2009/0138577 A1 | 5/2009 | Casado et al. | |
| 2009/0193513 A1 * | 7/2009 | Agarwal et al. | 726/15 |
| 2010/0054241 A1 * | 3/2010 | Shah et al. | 370/389 |
| 2011/0276683 A1 * | 11/2011 | Goldschlag et al. | 709/224 |
| 2011/0314517 A1 | 12/2011 | Yamato et al. | |

FOREIGN PATENT DOCUMENTS

| | | |
|---|---|---|
| JP | 2009-135805 A | 6/2009 |
| JP | 2010-541426 A | 12/2010 |
| WO | WO 2008/095010 A1 | 8/2008 |
| WO | WO 2011/081104 A1 | 7/2011 |

OTHER PUBLICATIONS

Nick McKeown et al, "OpenFlow: Enabling Innovation in Campus Networks", [online] [searched on Dec. 22, 2010] Mar. 14, 2008, Internet <URL: http://www.openflowswitch.org//documents/openflow-wp-latest.pdf>.

"OpenFlow Switch Specification" Version 1.1.0. (Wire Protocol 0x01) [ searched on Dec. 22, 2010] Dec. 31, 2009 Internet <URL: http://www.openflowswitch.org/documents/openflow-spec-v1.0.0.pdf>.

Hiroshi Ueno, et al., "A Study on Deployment of Network Appliance Functionalities in Datacenter Network", IEICE Technical Report, Nov. 13, 2009, vol. 109, No. 296, pp. 7-12.

Extended European Search Report dated Jan. 5, 2015.

Minlan Yu, et al. "Scalable Flow-Based Networking with DIFANE", Computer Communication Review, ACM, Aug. 30-Sep. 3, 2010, New York, New York, vol. 41, No. 4, pp. 351-362.

Martin Casado, et al. "Ethane: Taking Control of the Enterprise", Applications, Technologies, Architectures, and Protocols for Computer Communication: Proceedings of the 2007 Conference on Applications, Technologies, Architectures, and Protocols for Computer Communications, vol. 37, No. 4, XP-002531272, Aug. 27-31, 2007, Kyoto, Japan.

Chinese Office Action dated Mar. 9, 2015 with an English translation thereof.

* cited by examiner

Fig. 3

| USER ID | ROLE ID | ATTRIBUTES |
|---|---|---|
| user1 | role_0001 role_0002 | IP:192.168.100.1 MAC:00-00-00-44-55-66 |
| user2 | role_0002 | IP:192.168.100.2 MAC:00-00-00-77-88-99 |
| .. | .. | .. |

Fig. 4

| ROLE ID | RESOURCE GROUP ID | ACCESS RIGHTS |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| .. | .. | .. |

Fig. 5

| RESOURCE GROUP ID | RESOURCE ID | RESOURCE ATTRIBUTES |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| resource_group_0002 | resource_000X | IP:YYY.YYY.Y.Y |
| .. | .. | .. |

Fig. 6

| SOURCE | DESTINATION | ACCESS RIGHTS | CONDITIONS (OPTIONS) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| .. | .. | .. | .. |

Fig. 8

| REFERENCE RULE (MATCHING RULE) | ACTION |
|---|---|
| FLOW #A | FORWARD TO FORWARDING NODE 203 |
| .. | .. |
| AUTHENTICATED PACKET | FORWARD TO AUTHENTICATION DEVICE 310 |
| .. | .. |
| .. | .. |
| .. | .. |
| OTHER PACKETS | DROP |

HIGH PRIORITY ←——————————————→ LOW PRIORITY

Fig. 15

| REFERENCE RULE (MATCHING RULE) | ACTION |
|---|---|
| FLOW #A | FORWARD TO FORWARDING NODE 203 |
| FLOW #B | FORWARD TO FORWARDING NODE 202 |
| : | : |
| AUTHENTICATED PACKET | FORWARD TO AUTHENTICATION DEVICE 310 |
| : | : |
| PACKET RECEIVED FROM AUTHENTICATED TERMINAL 100 | FORWARD TO CONTROL DEVICE 300 |
| : | |
| OTHER PACKETS | DROP |

HIGH PRIORITY ←——————————————→ LOW PRIORITY

Fig. 22

| ROLE ID | RESOURCE GROUP ID | ACCESS RIGHTS | MOVEMENT RANGE LIMITATION |
|---|---|---|---|
| role_0001 | resource_group_0001 | allow | FORWARDING NODES 201, 203 |
| role_0001 | resource_group_0002 | allow | FORWARDING NODE 201 |
| role_0002 | resource_group_0001 | deny | - |
| role_0002 | resource_group_0002 | allow | FORWARDING NODE 201 |
| .. | .. | .. | .. |

Fig. 24

Header Fields; MATCHING RULE

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

COMMUNICATION SYSTEM, CONTROL DEVICE, POLICY MANAGEMENT DEVICE, COMMUNICATION METHOD, AND PROGRAM

DESCRIPTION OF RELATED APPLICATION

This application claims the benefit of priority of Japanese Patent Application No. 2011-009817, filed on Jan. 20, 2011, the disclosure of which is incorporated herein in its entirety by reference. The present invention relates to a communication system, a control device, a policy management device, a communication method, and a program, and in particular, relates to a communication system, a control device, a policy management device, a communication method, and a program, which realize communication by forwarding a packet via forwarding nodes arranged in a network.

BACKGROUND

Technical Field

In recent years, technology known as OpenFlow has been proposed (refer to Patent Literature (PTL) 1, and Non-Patent Literatures (NPL) 1 and 2). In OpenFlow, communication is taken as end-to-end flow, and path control, recovery from failure, load balancing, and optimization are performed in flow units. An OpenFlow switch as specified in Non-Patent Literature 2 is provided with a secure channel for communication with an OpenFlow controller that is regarded as a control device, and operates according to a flow table in which appropriate addition or rewriting is instructed by the OpenFlow controller. In the flow table are definitions of sets of matching rules (header fields) that refer to packet headers, flow statistical information (Counters), and actions (Actions) defining processing content, for each flow (refer to FIG. 24).

For example, when an OpenFlow switch receives a packet, an entry is searched for that has a matching rule (refer to the header fields of FIG. 24) that matches header information of the received packet, from the flow table. As a result of the search, in a case where an entry matching the received packet is found, the OpenFlow switch updates the flow statistical information (Counters), and also implements processing content (packet transmission from a specified port, flooding, dropping, and the like) described in an Actions field of the entry, for the received packet. On the other hand, as a result of the search, in a case where an entry matching the received packet is not found, the OpenFlow switch forwards the received packet to the OpenFlow controller via a secure channel, requests determination of a path of the packet based on source and destination of the received packet, receives a flow entry for realizing this, and updates the flow table. In this way, the OpenFlow switch uses the entry contained in the flow table as a processing rule to perform packet forwarding.

Furthermore, Patent Literature 2 has a description in which a control device corresponding to the abovementioned OpenFlow controller searches for an authenticated host or group policy, refers to the policy, and only in a case where a flow belonging to the received packet is allowed, performs determination and setting of a path according to the policy (refer to FIG. 6, and [0076] to [0077] of Patent Literature 2).

PTL1:
International Publication No. WO2008/095010A1
PTL2:
U.S. Patent Application Publication No. US2009/0138577A1
NPL 1:
Nick McKeown, and 7 others, "OpenFlow: Enabling Innovation in Campus Networks," [online], [search conducted Dec. 22, 2010] Internet<URL: http://www.openflowswitch.orgildocuments/openflow-wp-latest.pdf>.
NPL 2:
"OpenFlow: Switch Specification" Version 1.0.0. (Wire Protocol 0x01), [search conducted Dec. 22, 2010] Internet<URL: http://www.openflowswitch.org/documents/openflow-spec-v1.0.0.pdf>.

SUMMARY

The entire disclosures of the above mentioned Patent Literatures PTL 1, PTL 2 and Non-Patent Literatures NPL1, NPL2 are incorporated herein by reference thereto. The following analysis is given by the present invention. An OpenFlow controller of Patent Literature 1 refers to a policy file when a new flow is generated, performs a permission check, and thereafter carries out access control by calculating a path (refer to [0052] in Patent Literature 1, and to FIG. 6 and [0076] to [0077] in Patent Literature 2).

In an approximately similar way, after confirming whether or not a source host is an authenticated host according to an input port, a MAC (Media Access Control) address, or an IP address, each time a packet is received from a subordinate switch, a NOX (Controller) of Patent Literature 2 searches for a policy based on a group or name given to a user or host, and according to a result thereof, performs packet forwarding to an authenticated system, determination and setting of a path according to the policy, and packet dropping.

Therefore, there is a problem in that, with a configuration of either of Patent Literatures 1 or 2, load of a control device that responds to a path setting request from a subordinate switch increases. Furthermore, consideration has to be given also to a possibility of a DoS (Denial of Service) attack on a control device using this type of arrangement.

Thus, there is a need in the art to reduce load on a control device performing a policy check and path control on a forwarding node, in accordance with a request from the forwarding node as described above.

According to a first aspect of the present invention, there is provided a communication (network) system comprising: a control device; a forwarding node(s) that processes (or handles), in accordance with a processing rule set by the control device, a packet transmitted from a user terminal; and a policy management device that manages a communication policy and notifies the control device of a communication policy that corresponds to a user for whom authentication has succeeded, wherein the control device further comprises: a setting request transmission permitting unit that, based on a notification from the policy management device, sets to a forwarding node that receives a packet from the user terminal a first processing rule causing the forwarding node to make a setting request of a processing rule with regard to a packet transmitted from the user terminal; and a path control unit that, in a case of receiving the setting request from a forwarding node to which the first processing rule is set, determines a path from the user terminal to an access destination in accordance with the communication policy, and sets to a forwarding node along the path a second processing rule that corresponds to the path.

According to a second aspect of the present invention, there is provided a control device that is connected to: a forwarding node that processes, in accordance with a processing rule set by the control device, a packet transmitted from a user terminal; and a policy management device that manages a communication policy and notifies the control device of a communication policy that corresponds to a user for whom authentication has succeeded, wherein the control device comprises: a setting request transmission permitting unit that, based on a notification from the policy management device, sets to a forwarding node that receives a packet from the user terminal a first processing rule causing the forwarding node to make a setting request of a processing rule with regard to a packet transmitted from the user terminal; and a path control unit that, in a case of receiving the setting request from a forwarding node to which the first processing rule is set, determines a path from the user terminal to an access destination in accordance with the communication policy, and sets to a forwarding node along the path a second processing rule that corresponds to the path.

According to a third aspect of the present invention, there is provided a policy management device that provides the abovementioned control device with a communication policy that corresponds to a user for whom authentication has succeeded.

According to a fourth aspect of the present invention, there is provided a communication method performed by a control device connected to: a forwarding node that processes, in accordance with a processing rule set by the control device, a packet transmitted from a user terminal; and a policy management device that manages a communication policy and notifies the control device of a communication policy that corresponds to a user for whom authentication has succeeded, wherein the communication method comprises: based on a notification from the policy management device, setting to a forwarding node that receives a packet from the user terminal a first processing rule causing the forwarding node to make a setting request of a processing rule with regard to a packet transmitted from the user terminal; and in a case of receiving the setting request from a forwarding node for which the first processing rule is set, determining a path from the user terminal to an access destination in accordance with the communication policy, and setting to a forwarding node along the path a second processing rule that corresponds to the path. The present method is linked with a specific instrument, known as a control device that controls the abovementioned forwarding node.

According to a fifth aspect of the present invention, there is provided a program that causes a computer comprising included in a control device connected to: a forwarding node that processes, in accordance with a processing rule set by the control device, a packet transmitted from a user terminal; and a policy management device that manages a communication policy and notifies the control device of a communication policy that corresponds to a user for whom authentication has succeeded, to execute: based on a notification from the policy management device, setting to a forwarding node that receives a packet from the user terminal a first processing rule causing the forwarding node to make a setting request of a processing rule with regard to a packet transmitted from the user terminal; and in a case of receiving the setting request from a forwarding node for which the first processing rule is set, determining a path from the user terminal to an access destination in accordance with the communication policy, and setting to a forwarding node along the path a second processing rule that corresponds to the path. It is to be noted that the program can be recorded in computer readable storage media. That is, the present invention can be embodied as a computer program product.

The present invention provides the following advantage, but not restricted thereto. According to the present invention, it is possible to reduce load on a control device performing a policy check and path control of a forwarding node, in accordance with a request from the forwarding node.

BRIEF DESCRIPTION OF THE DRAWINGS

FIG. 3 is an example of authentication information stored in an authentication device of the first exemplary embodiment of the present invention.

FIG. 4 is an example of communication policy information stored in a communication policy storage unit of the first exemplary embodiment of the present invention.

FIG. 5 is an example of resource information stored in a resource information storage unit of the first exemplary embodiment of the present invention.

FIG. 6 is an example of a communication policy notified to a control device from a policy management device of the first exemplary embodiment of the present invention.

FIG. 8 is a sequence diagram representing a sequence of operations of the first exemplary embodiment of the present invention.

FIG. 15 is a diagram showing a state where a second processing rule is added to the processing rule storage table of FIG. 12.

FIG. 22 is an example of communication policy information stored in a communication policy storage unit of a fourth exemplary embodiment of the present invention.

FIG. 24 is a diagram representing a configuration of a flow entry described in Non-Patent Literature 2.

PREFERRED MODES

Figure 1:
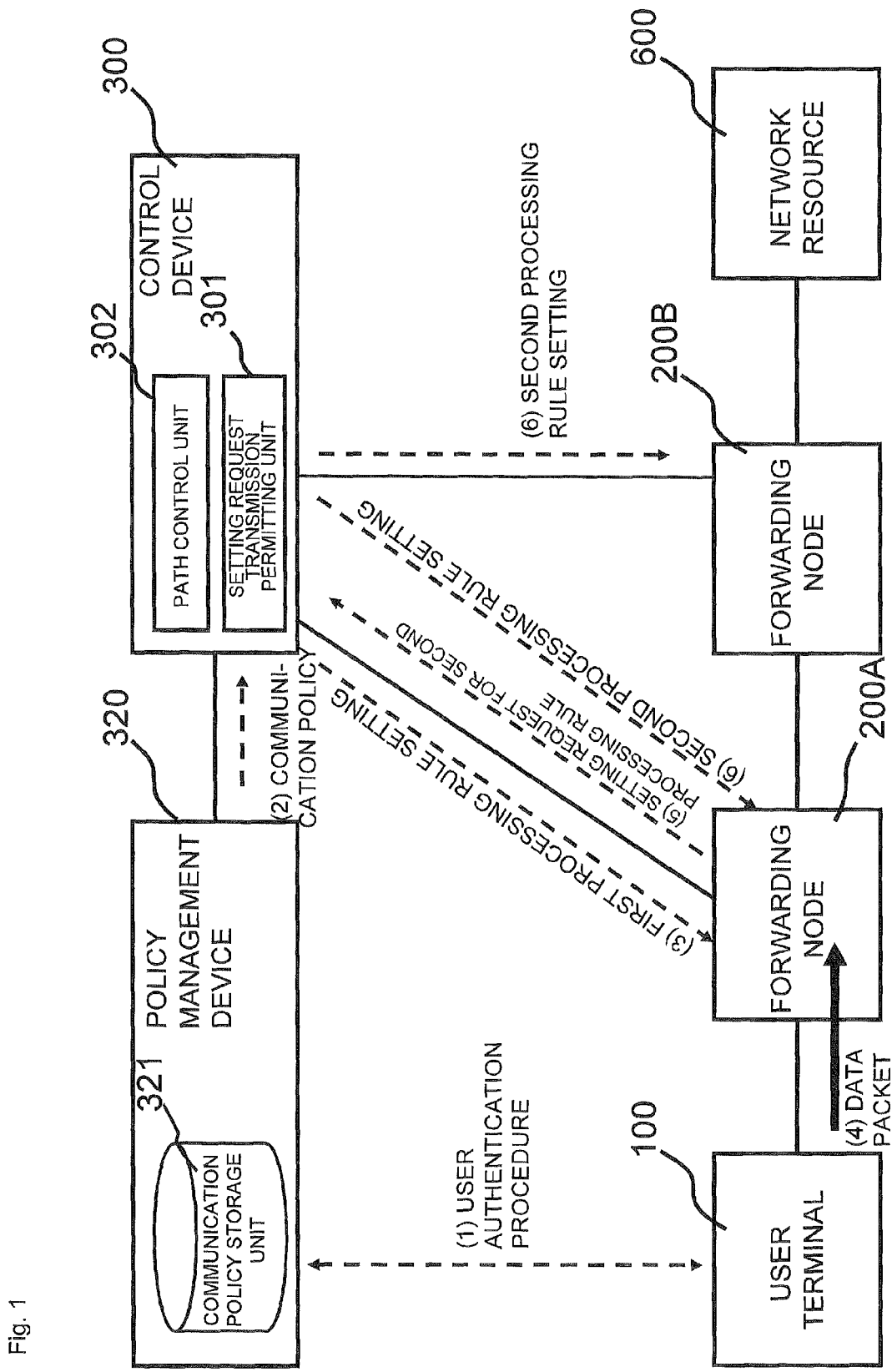
FIG. 1 is a diagram for describing an outline of the present invention.

In the present disclosure, there are various possible modes, which include the following, but not restricted thereto. First, a description is given concerning an outline of the present invention, making reference to the drawings. As shown in FIG. 1, the present invention is realized by forwarding nodes 200A and 200B that forward a packet transmitted from a user terminal in accordance with a processing rule set by a control device 300, a policy management device 320 that manages a communication policy and notifies the control device 300 of a communication policy, which has been granted to a user for whom authentication has succeeded, and the control device 300 that sets a processing rule in the forwarding nodes 200A and 200B. It is to be noted that reference symbols in drawings appended to this summary are attached to respective elements for convenience as an example in order to assist understanding, and are not intended to limit the present invention to modes shown in the drawings.

More specifically, the control device 300 comprises a setting request transmission permitting unit 301 and a path control unit 302. The setting request transmission permitting unit 301 sets a first processing rule causing a forwarding node (for example, the forwarding node 200A of FIG. 1) that receives a packet from the user terminal 100, to make a setting request of a processing rule with regard to a packet transmitted from the user terminal 100, based on a notification (FIG. 1, (2) communication policy) from the policy management device 320, sent at a prescribed trigger (for example, FIG. 1, (1) user authentication protocol) (FIG. 1, (3) first processing rule setting).

Thereafter, on receiving a data packet from the user terminal 100 (FIG. 1, (4) data packet), a forwarding node (for example, the forwarding node 200A of FIG. 1) makes a request to the control device 300 to set a processing rule with regard to a packet transmitted from the user terminal 100 in accordance with the first processing rule.

In a case of receiving a request for setting of a processing rule from a forwarding node as described above (FIG. 1, (5) setting request for second processing rule), the path control unit 302 of the control device 300 generates a path from the user terminal 100 to an access destination (for example, a network resource 600) in accordance with the communication policy, and sets the second processing rule realizing the path (FIG. 1, (6) setting of second processing rule).

Furthermore, in a case of receiving a packet for which neither the first nor the second processing rules is relevant, the forwarding nodes 200A and 200B perform processing to drop (discard) the packet.

As described above, since a condition that the first processing rule is set must be satisfied in order to request the control device 300 to set the second processing rule that processes a real flow, it is possible to have an arrangement such that requests to set processing rules are not concentrated in the control device, and also that resistance to a DoS attack can be improved.

It is to be noted that the example of FIG. 1 shows a configuration in which the control device 300 comprises the setting request transmission permitting unit 301 and the path control device 302, each of which is independent, but since both have a common point in that they generate and set a processing rule, realization is possible by two processing means with separate functions, being a means for generating a processing rule (path and action calculating unit of a first exemplary embodiment as described later) and a means for setting a processing rule (a processing rule management unit of the first exemplary embodiment as described later), as adopted in an exemplary embodiment to be described later.

First Exemplary Embodiment

Figure 2:
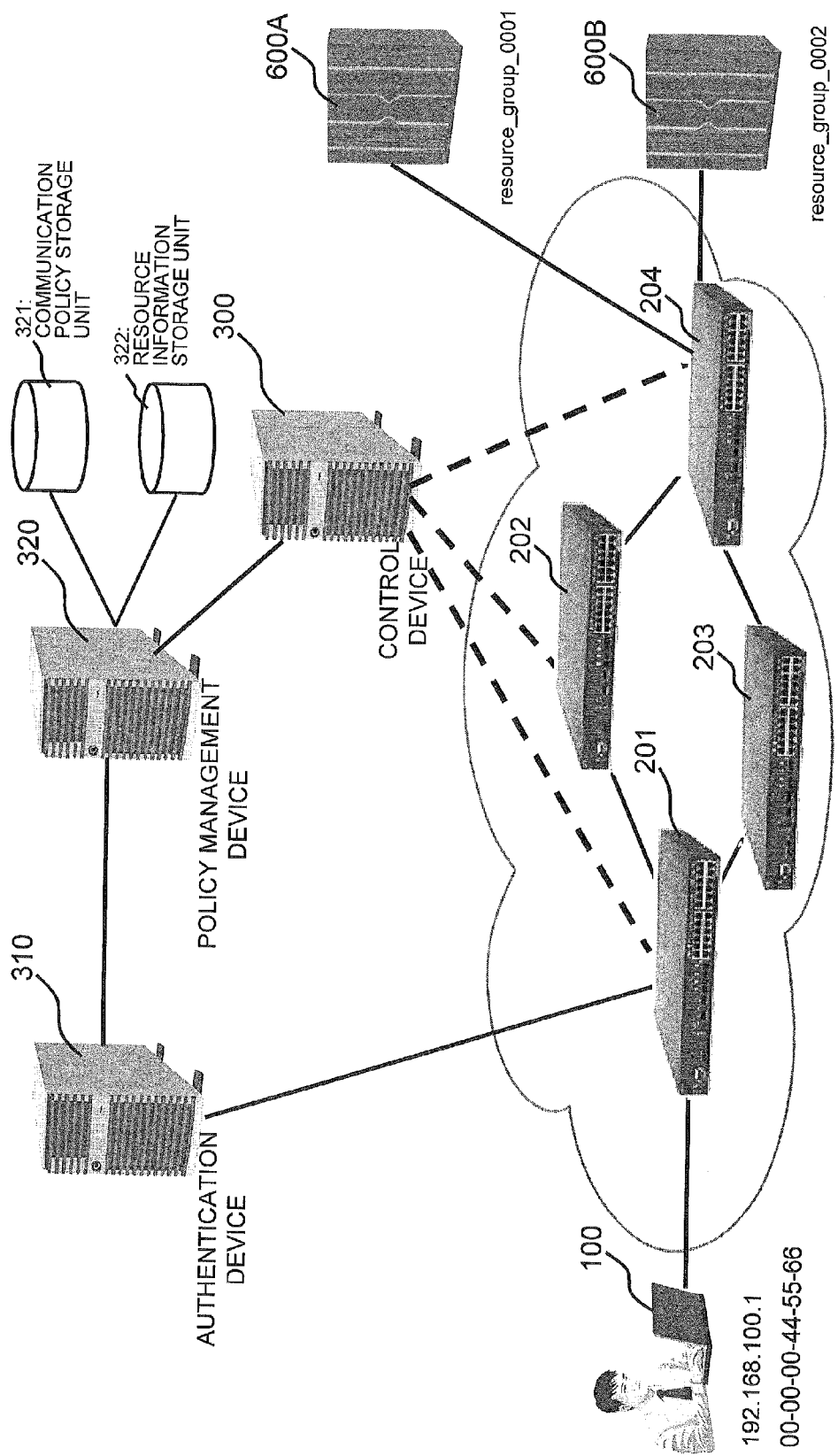
FIG. 2 is a diagram representing a configuration of a communication system of a first exemplary embodiment of the present invention.

Next, a detailed description is given concerning a first exemplary embodiment of the present invention, making reference to the drawings. FIG. 2 is a diagram representing a configuration of a communication system of the first exemplary embodiment of the present invention. Referring to FIG. 2, a configuration is shown that includes a plurality of forwarding nodes 201 to 204, a control device 300 that sets a processing rule in these forwarding nodes, a policy management device 320 that notifies the control device 300 of a communication policy, and an authentication device 310 that provides authentication information showing an authentication result to the policy management device 320.

The forwarding nodes 201 to 204 are switching devices that process a received packet in accordance with a processing rule associating a matching rule that refers to a received packet and processing content applied to a packet that matches the matching rule. With regard to these forwarding nodes 201 to 204, it is possible to use an OpenFlow switch as in Non-Patent Literature 2 whereby a flow entry shown in FIG. 24 is operated as a processing rule.

Furthermore, network resources 600A and 600B are connected to the forwarding node 204, and a user terminal 100 can communicate with the network resources 600A and 600B, via the forwarding nodes 201 to 204. In the following exemplary embodiment, the network resource 600A and the network resource 600B respectively belong to different resource groups, and resource_group_0001 and resource_group_0002 are attached thereto as respective resource group IDs.

The authentication device 310 is an authentication server or the like that uses a password or biometric authentication information to perform a user authentication protocol with a user terminal 100. The authentication device 310 transmits authentication information indicating a result of the user authentication protocol with the user terminal 100 to the policy management device 320.

FIG. 3 is an example of authentication information stored in the authentication device 310 of the present exemplary embodiment. For example, in a case where authentication of a user whose user ID is user1 succeeds, the authentication device 310 transmits attributes of user1, IP address: 192.168.100.1, and MAC address: 00-00-00-44-55-66, and a user1 entry of role ID: role_0001 and role_0002 as authentication information to the policy management device 320. Similarly, in a case where authentication of a user whose user ID is user2 succeeds, attributes of user2, IP address: 192.168.100.2, and MAC address: 00-00-00-77-88-99, and a user2 entry of role ID: role_0002 are transmitted as authentication information to the policy management device 320.

It is to be noted that the authentication information may be information whereby the policy management device 320 can determine a communication policy given to a user, and is not limited to an example of FIG. 3. For example, it is possible to use the user ID of a user for whom authentication has succeeded, a role ID derived from the user ID, an access ID such as a MAC address or the like, location information for the user terminal 100, or a combination thereof, as authentication information. Clearly, information concerning a user for whom authentication has failed may be transmitted to the policy management device 320, as authentication information, and a communication policy whereby the policy management device 320 limits access from the user may be transmitted to the control device 300.

The policy management device 320 is a device that is connected to a communication policy storage unit 321 and a resource information storage unit 322; determines a communication policy in response to authentication information received from the authentication device 310; and transmits to the control device 300.

FIG. 4 is an example of communication policy information stored in the communication policy storage unit 321. In the example of FIG. 4, for each role identified by a role ID, communication policy information is shown which sets a resource group ID given to a group of resources, and access rights. For example, a user having a role ID: role_0001 is allowed access to both resource group IDs: resource_group_0001 and resource_group_0002. On the other hand, a user having a role ID: role_0002 is not allowed access to the resource group ID: resource_group_0001, but is allowed access to the resource_group_0002.

FIG. 5 is an example of resource information stored in the resource information storage unit 322. The example of FIG. 5 has content associating resource IDs of resources belonging to the abovementioned resource group IDs and detailed attributes thereof. For example, resources of resource_0001, resource_0002, and resource_0003 are included in a group identified by the resource group ID: resource_group_0001, and it is possible to identify IP address, MAC address, and port numbers used in services, for each thereof.

Referring to the communication policy information and resource information as described above, the policy management device 320 determines a communication policy for a user who has received authentication in the authentication device 310, and gives a notification to the control device 300. For example, with a role ID included in authentication information received from the authentication device 310, it is possible to identify content of a resource group ID attached to the corresponding role ID and access rights thereof, from the policy information of FIG. 4. Information of a resource belonging to the resource group ID from the resource information of FIG. 5 is used to generate a communication policy.

FIG. 6 illustrates a communication policy of a user having a user ID: user1 generated from information shown in FIG. 3, FIG. 4, and FIG. 5. A value of attributes information of the user ID: user1 of the authentication information of FIG. 3 is set in a source field of FIG. 6. Furthermore, a resource attribute extracted from the resource information of FIG. 5 is set, based on content of the role ID: role_0001 of the policy information of FIG. 4, in a destination field. In addition, a value the same as the access rights of the role ID: role_0001 of the policy information of FIG. 4 is set in an access rights field. Furthermore, a service that is set in a resource attributes field of resource information of FIG. 5 and a port number are set in a conditions (options) field.

On receiving the communication policy as described above, the control device 300 first generates a first processing rule whereby a request for setting of a processing with regard to a packet from a user that is a target of application of the communication policy is transmitted, and to be set in a forwarding node selected from the forwarding nodes 201 to 204. Furthermore, in a case of receiving a request for setting of a processing rule, according to the first processing rule, the control device 300 generates a forwarding path for a packet and a processing rule realizing the forwarding path, based on packet information included in the request for setting of the processing rule, to be set in a forwarding node along the packet forwarding path.

Figure 7:
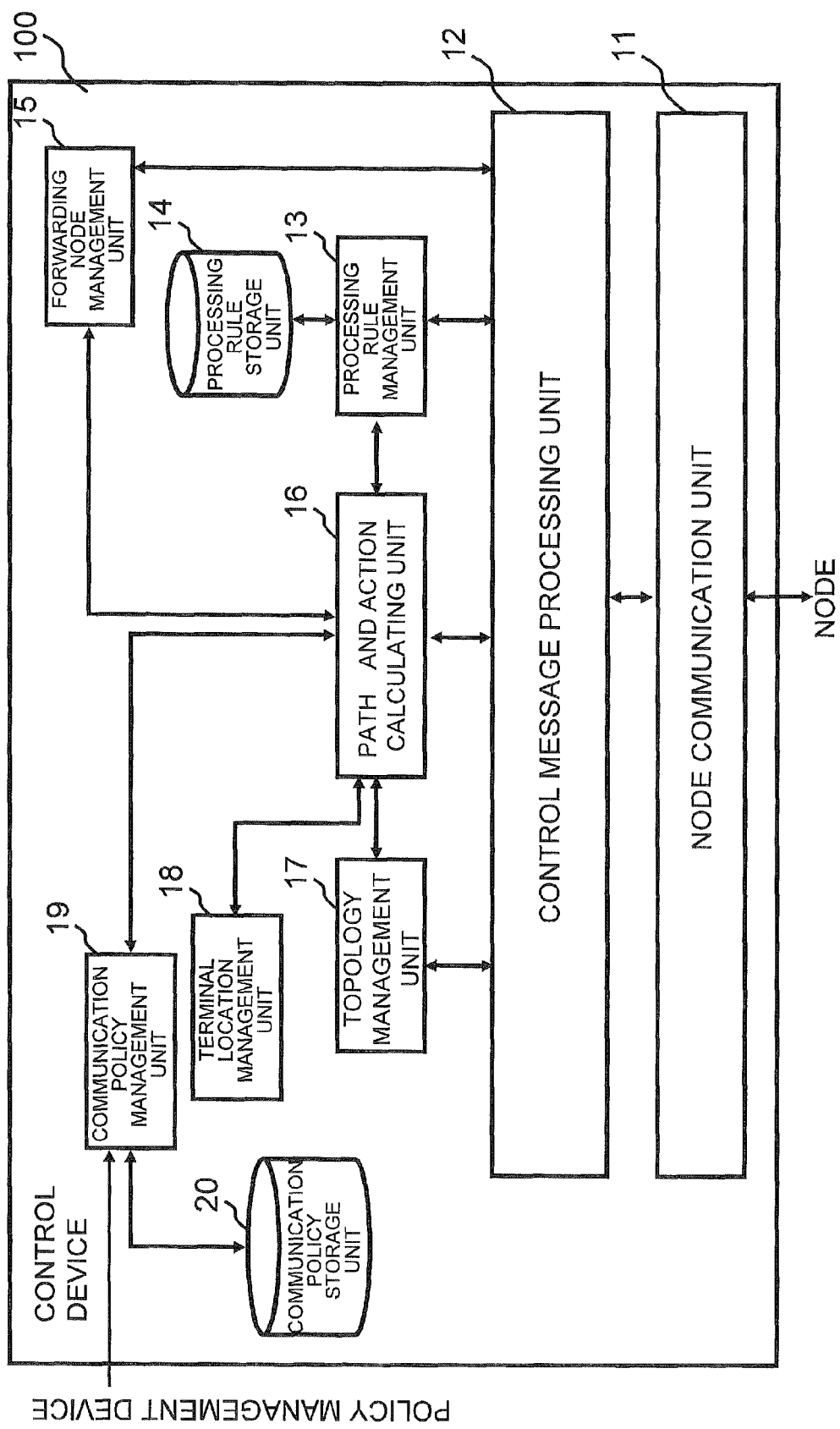
FIG. 7 is a block diagram representing a configuration of a control device of the first exemplary embodiment of the present invention.

FIG. 7 is a block diagram representing a detailed configuration of the control device 300 of the present exemplary embodiment. Referring to FIG. 7, the control device 300 comprises: a node communication unit 11 that performs communication with the forwarding nodes 201 to 204, a control message processing unit 12, a processing rule management unit 13, a processing rule storage unit 14, a forwarding node management unit 15, a path and action calculating unit 16, a topology management unit 17, a terminal location management unit 18, a communication policy management unit 19, and a communication policy storage unit 20. These respectively operate as follows.

The control message processing unit 12 analyzes a control message received from a forwarding node, and delivers the control message information to a relevant processing means in the control device 300.

The processing rule management unit 13 manages how a processing rule is set and in which forwarding node. Specifically, a processing rule generated in the path and action calculating unit 16 is registered in the processing rule storage unit 14 and set in a forwarding node, and in response to a case where a change occurs in a processing rule that has been set in a forwarding node, according to a processing rule deletion notification or the like from a forwarding node, registered information in the processing rule storage unit 14 is updated.

The forwarding node management unit 15 manages capability (for example, the number and type of ports, the type of actions supported, and the like) of a forwarding node controlled by the control device 300.

On receiving a communication policy from the communication policy management unit 19, the path and action calculating unit 16 first refers to network topology stored in the topology management unit 17, in accordance with the communication policy, and generates a processing rule (first processing rule) that executes a request for setting of a processing with regard to a packet from a user. It is to be noted that the forwarding node having a set destination of the processing rule (first processing rule) may be all forwarding nodes to which there is a possibility of the user terminal 100 connecting to, or, may a forwarding node (for example, the forwarding node 201 of FIG. 1) may be selected from the terminal location management unit 18 based on source information included in the communication policy.

Furthermore, on receiving a request for setting of a processing rule, based on the abovementioned processing rule (first processing rule), the path and action calculating unit 16 generates, based on packet information included in the request for setting of the processing rule, a forwarding path for the packet and a processing rule realizing the forwarding path.

Specifically, the path and action calculating unit 16 computes the forwarding path of the packet based on location information of a communication terminal managed by the terminal location management unit 18 and network topology information configured in the topology management unit 17. Next, the path and action calculating unit 16 acquires port information and the like of a forwarding node in the forwarding path, from the forwarding node management unit 15, and obtains an action executed in a forwarding node in the path in order to realize the computed forwarding path, and a matching rule that identifies a flow to which the action is applied. It is to be noted that the matching rule can be generated using a source IP address, a destination IP address, conditions (options), or the like, of the communication policy of FIG. 6. Therefore, in a case of a first entry of the communication policy of FIG. 6, with respect to a packet from a source IP 192.168.100.1 to a destination IP 192.168.0.1, respective processing rules are generated that decide a forwarding node which is a subsequent hop, or an action for forwarding from a port to which the network resources 600A and 600B are connected. It is to be noted that on the occasion of setting the abovementioned processing rule, a processing rule may be generated not only for a packet for which a request for setting of a processing rule has been received, but also for realizing packet forwarding to a resource for which a user terminal has access rights.

The topology management unit 17 configures network topology information based on connection relations of the forwarding nodes 201 to 204 collected via the node communication unit 11.

The terminal location management unit 18 manages information that identifies the location of a user terminal connected to the communication system. In the present exemplary embodiment, a description is given in which, with an IP address as information for identifying a user terminal, information of a forwarding node identifier of a forwarding node to which the user terminal is connected, and of a port thereof, is used as information for identifying the location of the user terminal. Clearly, instead of these items of information, information provided by the authentication device 310, for example, or the like may be used to identify the terminal and its location.

On receiving communication policy information from the policy management device 320, the communication policy management unit 19 stores the information in the communication policy storage unit 20, and also transmits the information to the path and action calculating unit 16.

The above type of control device 300 can be realized by adding a function to generate the first processing rule (flow entry) with receipt of the abovementioned communication policy as a trigger, based on an OpenFlow controller of Non-Patent Literatures 1 and 2.

Furthermore, respective units (processing means) of the control device 300 shown in FIG. 7 can be realized by a computer program that stores the respective information items described above and executing each of the processes described above, in a computer forming the control device 300, by using hardware thereof.

Next, a detailed description is given concerning an operation of the present exemplary embodiment making reference to the drawings. In the following, a description is given in which a processing rule is set, as shown in FIG. 8, in the forwarding node 201 connected to the user terminal. The uppermost entry is a processing rule that forwards a packet belonging to flow #A to the forwarding node 203. The third entry from the top is a processing rule that forwards an authenticated packet to the authentication device 310. Furthermore, the lowermost entry is a processing rule that drops other packets that do not relate to the highest priority processing rule as described above. In addition, in order to search for a processing rule having a matching rule that matches a received packet, in sequence from above, a forwarding node is given a priority in which the higher the position is, the higher the priority.

Figure 9:
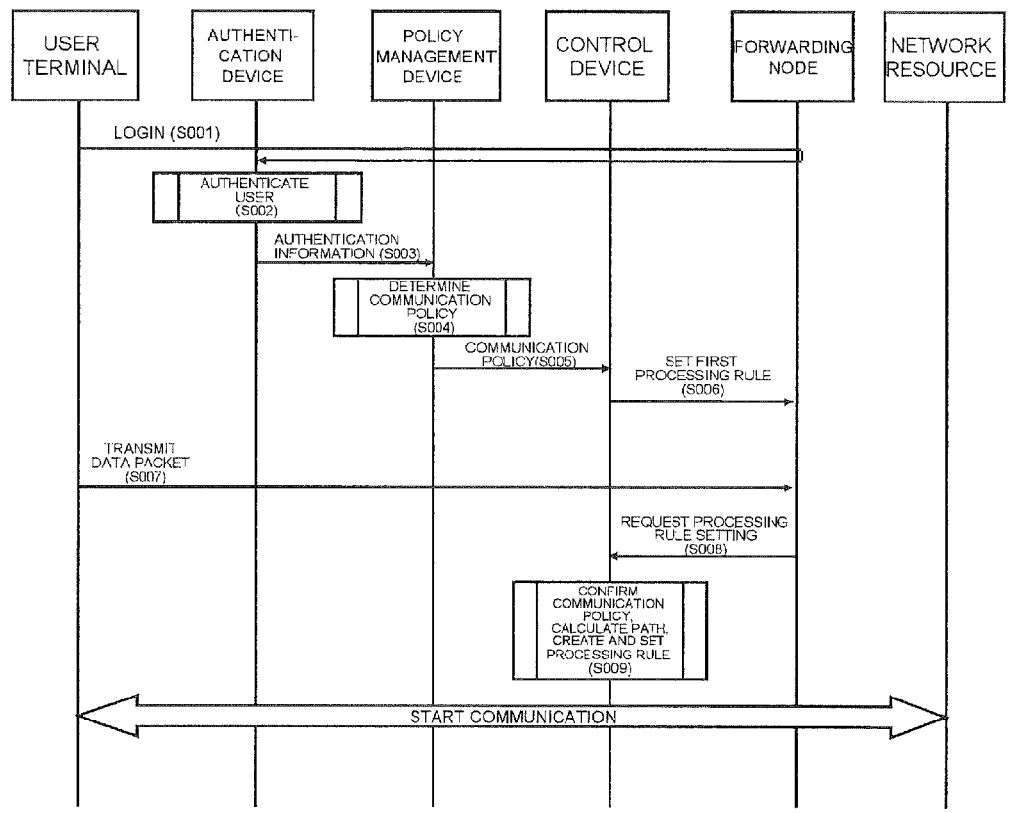
FIG. 9 is a diagram representing a processing rule storage table stored in a forwarding node of the first exemplary embodiment of the present invention.
Figure 10:
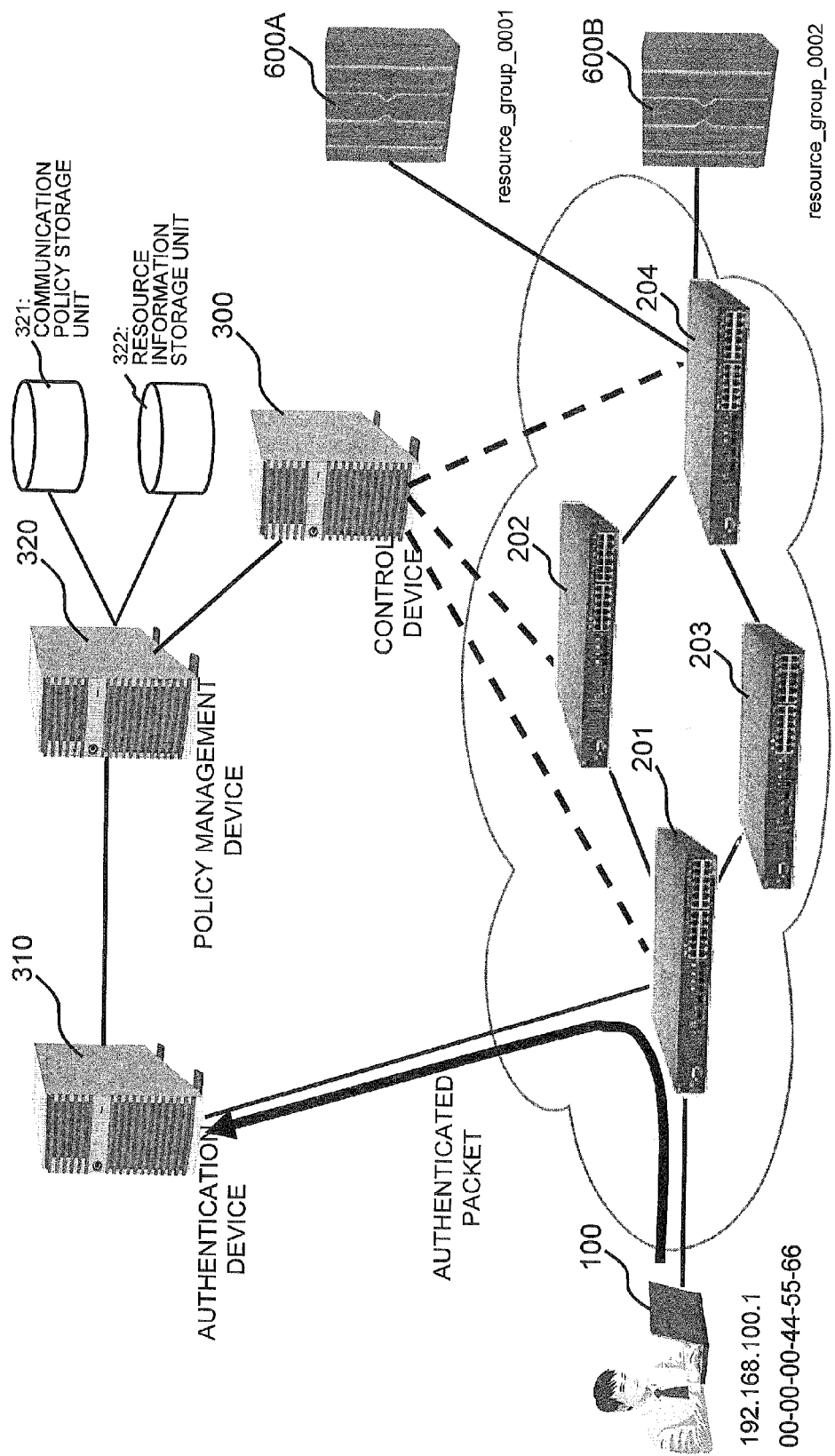
FIG. 10 is a diagram for describing operations until a user, who is using a communication system of the first exemplary embodiment of the present invention, receives user authentication from an authentication device.

FIG. 9 is a sequence diagram representing a sequence of operations of the present exemplary embodiment. Referring to FIG. 9, first, when a user terminal makes a login request to the authentication device 310, as shown in FIG. 10, the forwarding node 201 performs packet forwarding to the authentication device 310, in accordance with a processing rule for an authenticated packet shown in FIG. 8 (S001 in FIG. 9).

Figure 11:
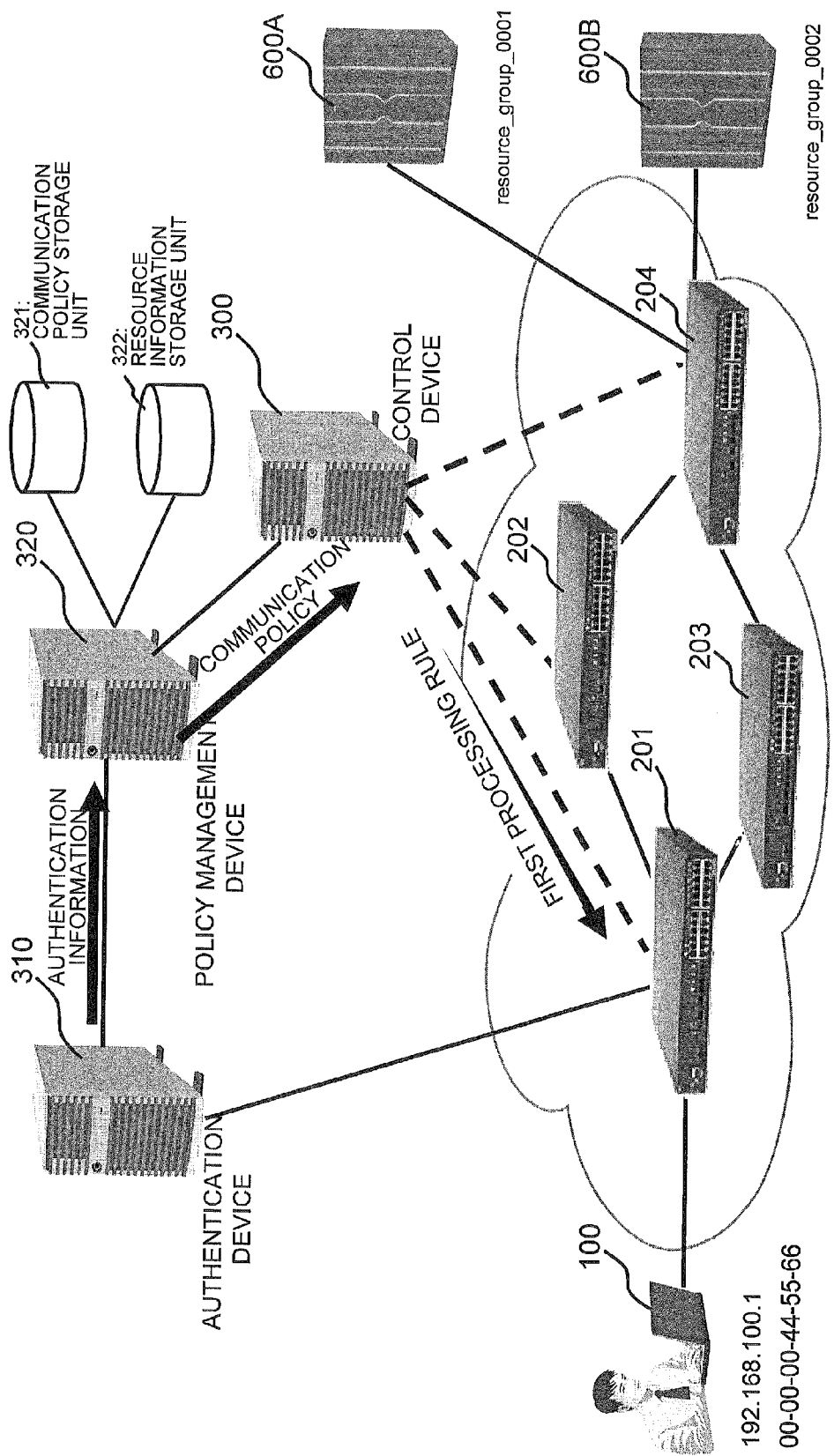
FIG. 11 is a continuation diagram of FIG. 10.

When the authentication device 310 performs user authentication (S002 in FIG. 9), and transmits authentication information to the policy management device 320 (S003 in FIG. 9), the policy management device 320 refers to the communication policy storage unit 321 and the resource information storage unit 322 based on the received authentication information, determines a communication policy (S004 in FIG. 9), and transmits to the control device 300 (refer to S005 in FIG. 9, and to FIG. 11).

On receiving the communication policy, the control device 300 sets a first processing rule for making a setting request of a processing with regard to a packet from the user terminal, in the forwarding node 201 (refer to S006 in FIG. 9, and to FIG. 11).

Figure 12:
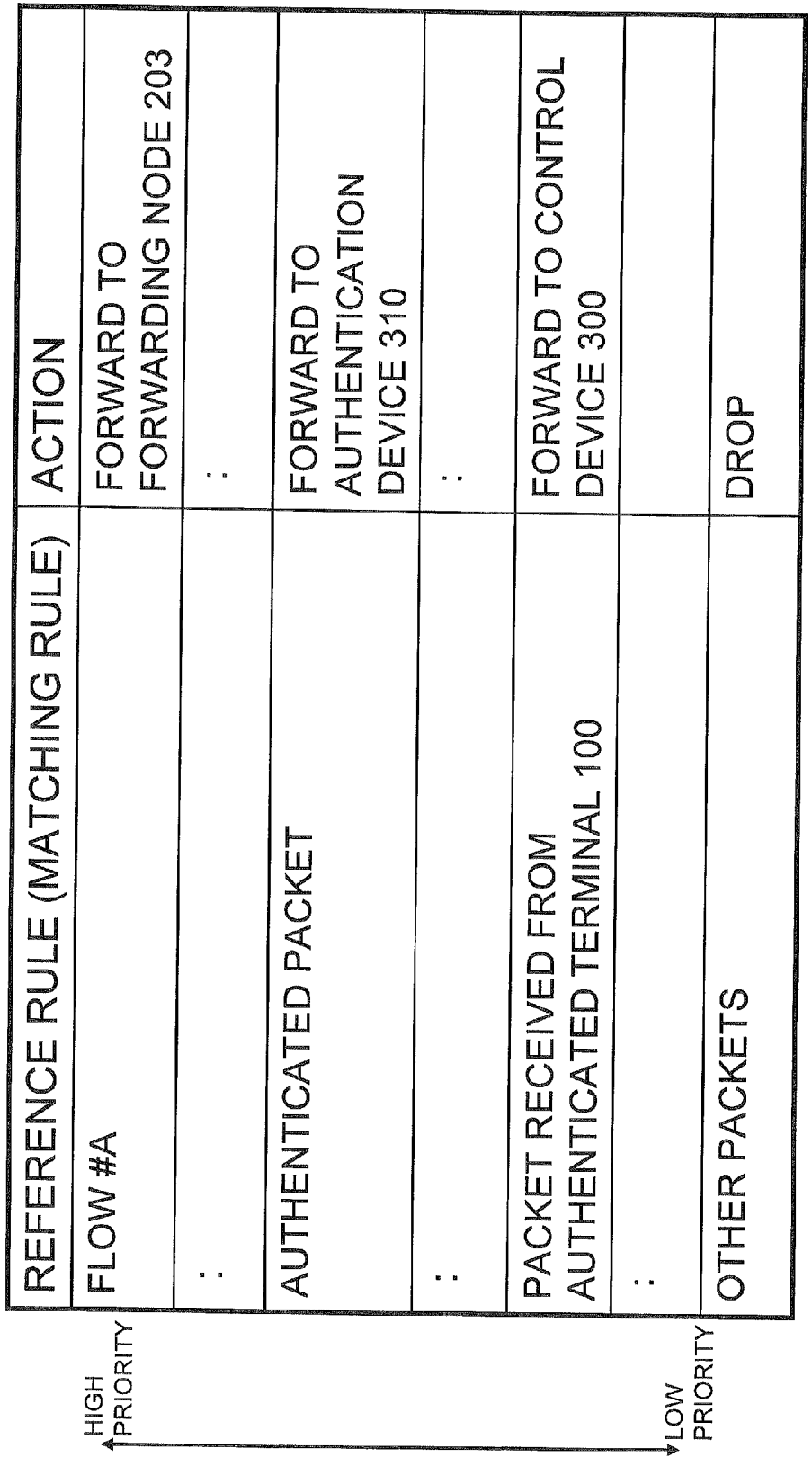
FIG. 12 is a diagram showing a state where a first processing rule is added to the processing rule storage table of FIG. 9.

FIG. 12 is a diagram showing a processing rule set in the forwarding node 201, after setting the first processing rule. In the example of FIG. 12, a processing rule (first processing rule) that causes a received packet to be forwarded to the control device 300 from an authenticated terminal is set to a location with a lower priority than an authenticated packet.

Figure 13:
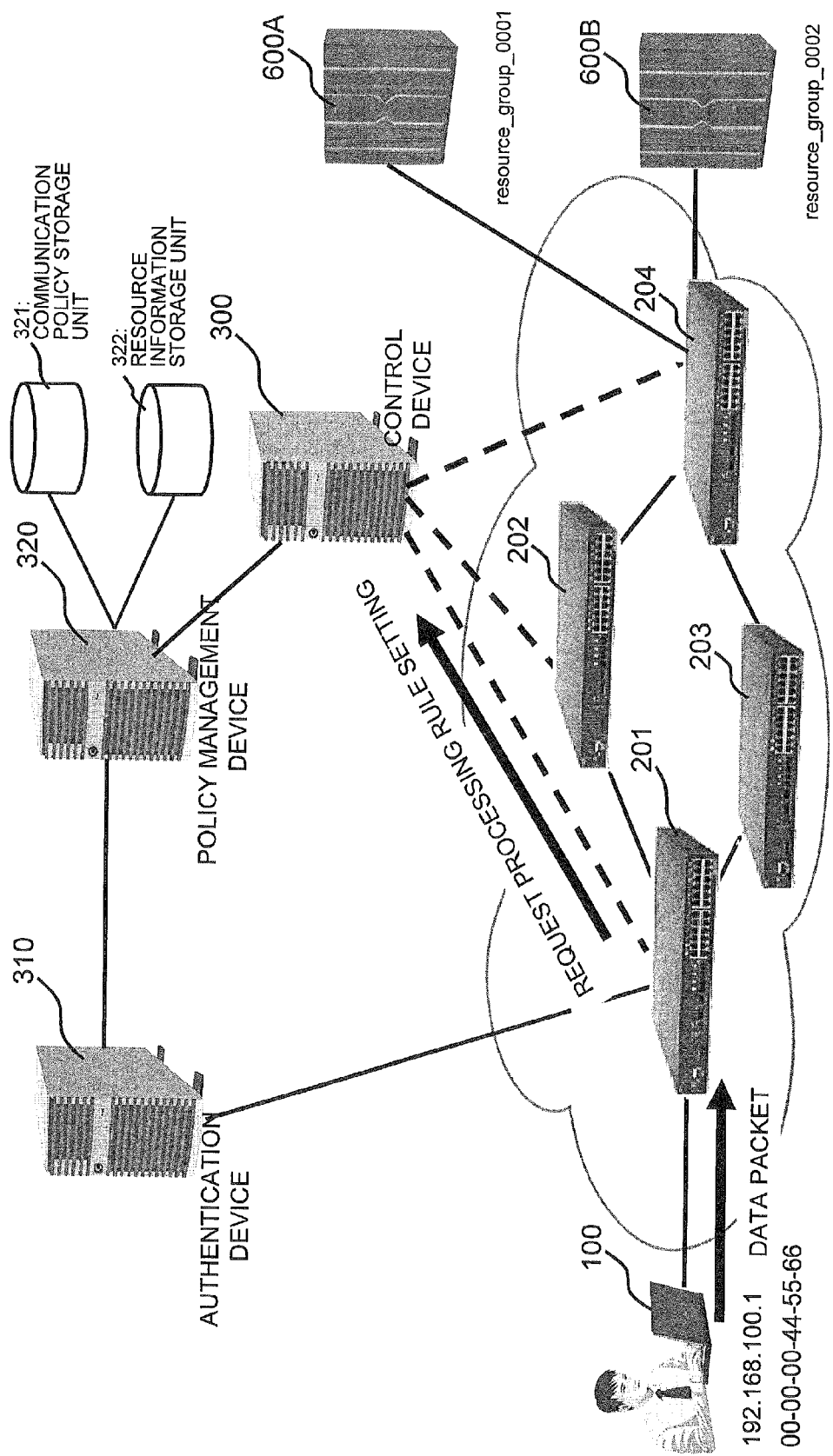
FIG. 13 is a continuation diagram of FIG. 11.

Thereafter, when the user terminal transmits a packet with a destination of a network resource (S007 in FIG. 9), as shown in FIG. 13, the forwarding node 201 in which the first processing rule has been set transmits a request for setting of a processing rule, to the control device 300 (S008 in FIG. 9).

Figure 14:
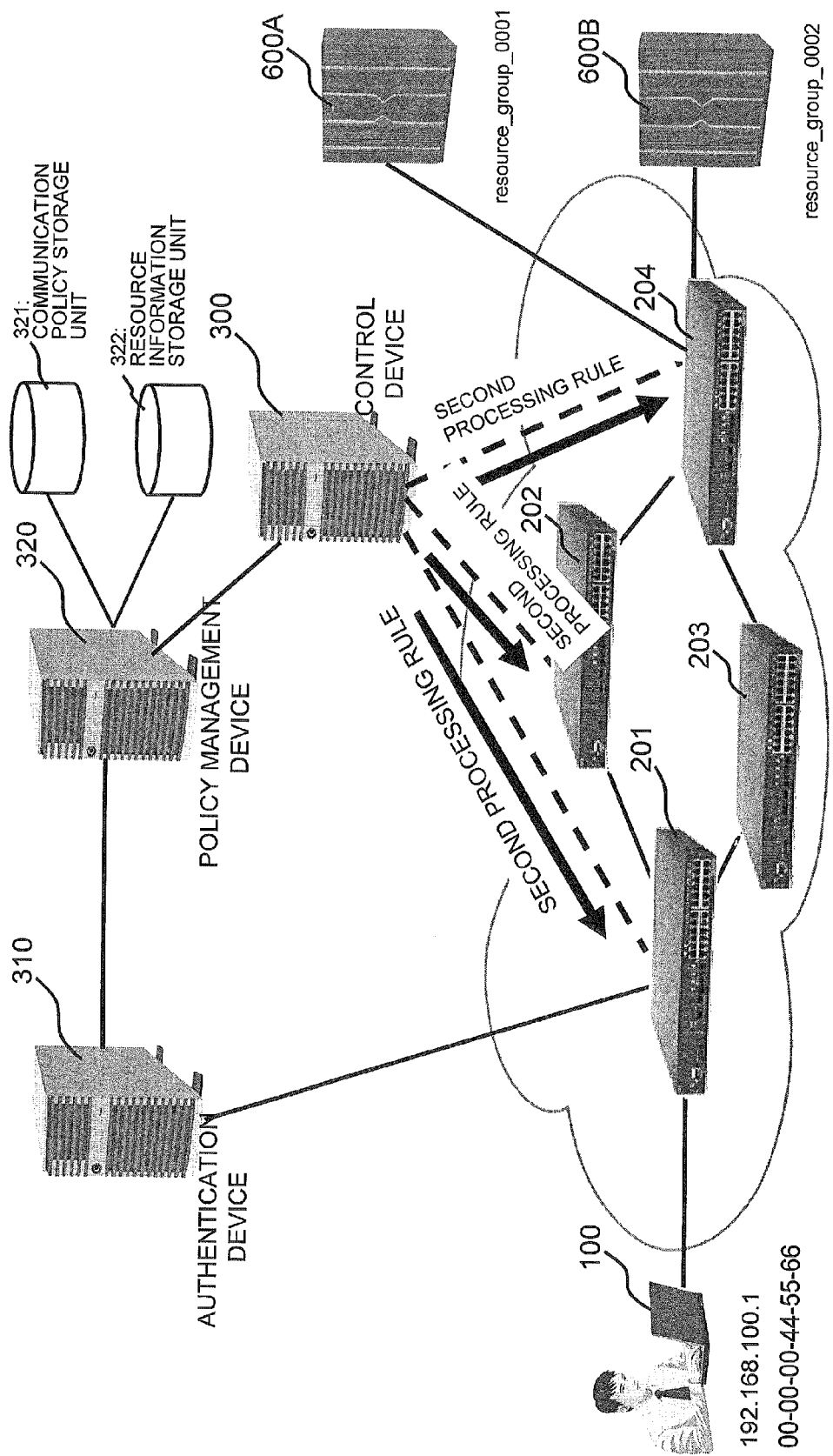
FIG. 14 is a continuation diagram of FIG. 13.

The control device 300 that has received the request for setting of a processing rule performs calculation of a forwarding path of a packet for which the request for setting of the processing rule has been received, in accordance with a communication policy, and as shown in FIG. 14, generates and sets a processing rule prescribing packet processing content in respective forwarding nodes (S009 in FIG. 9).

FIG. 15 is a diagram showing a processing rule set in the forwarding node 201, after setting the second processing rule. In the example of FIG. 15, a processing rule (second processing rule) that causes a user terminal to forward a packet (flow #B) with a destination of a network resource to the forwarding node 202.

Figure 16:
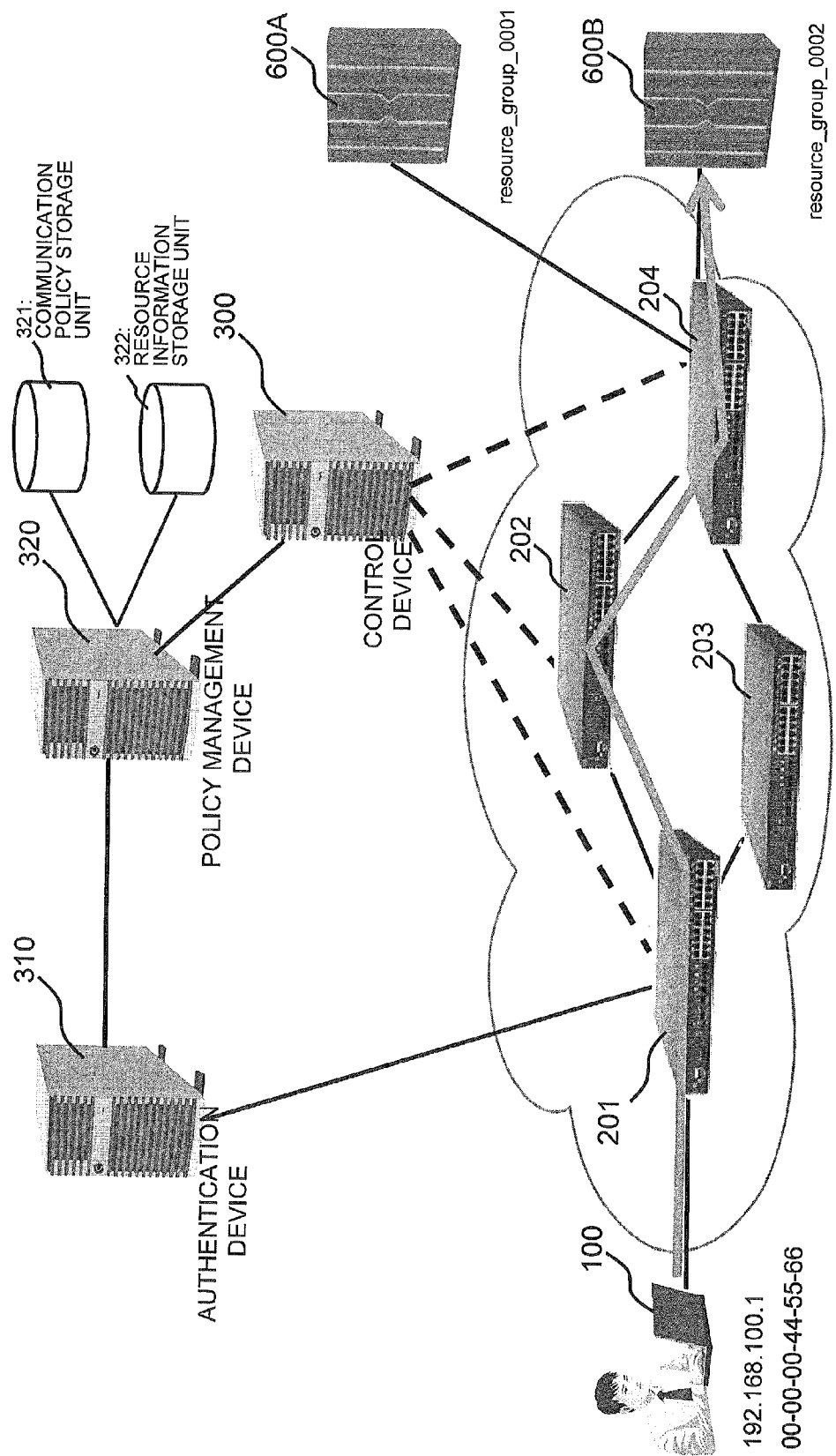
FIG. 16 is a continuation diagram of FIG. 14.

As described above, when the control device 300 sets a processing rule in a forwarding node in a forwarding path, as shown in FIG. 16, communication becomes possible between the user terminal and the network resource ("start communication" in FIG. 9).

Figure 17:
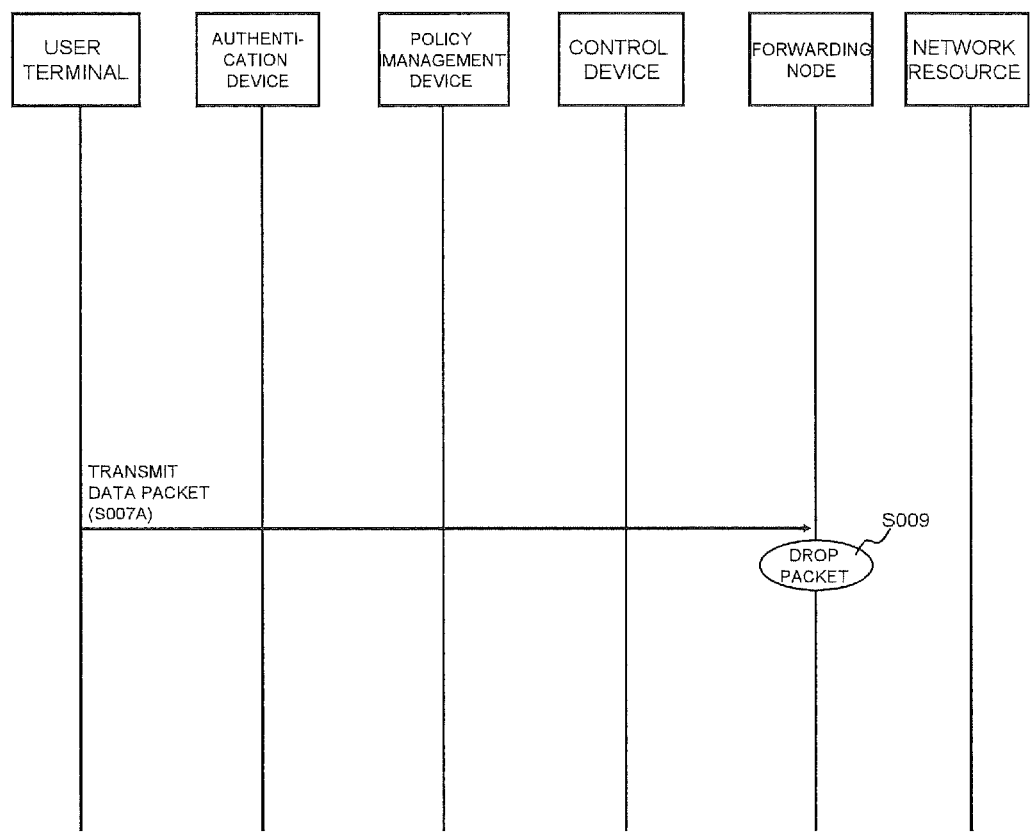
FIG. 17 is a sequence diagram representing operations when the communication system of the first exemplary embodiment of the present invention receives a data packet of an unauthenticated user.

FIG. 17 is a sequence diagram representing operations in a case where a packet with a destination of a network resource is transmitted by the user terminal, without passing user authentication. As shown in FIG. 8, since there has been set, in the forwarding node 201, a processing rule that drops (discards) packets (other packets in FIG. 8) which do not match a processing rule that has already been set, the forwarding node 201 drops the received packet (S009 in FIG. 17).

Figure 18:
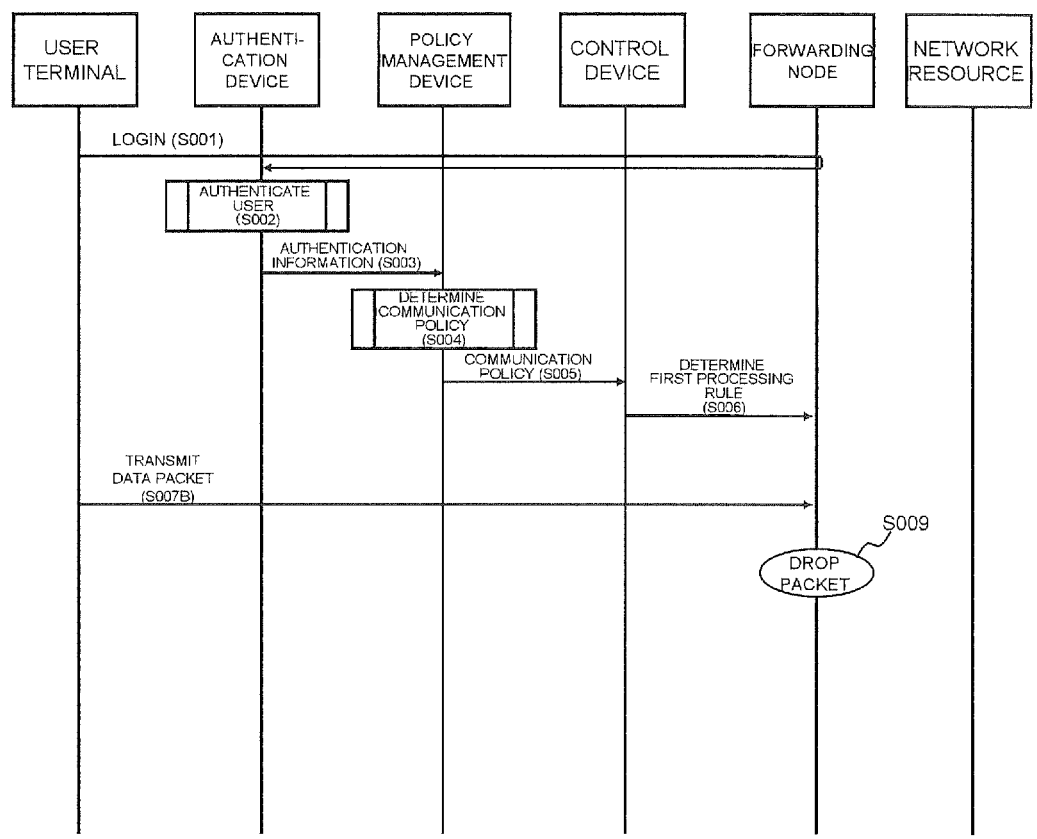
FIG. 18 is a sequence diagram representing operations when the communication system of the first exemplary embodiment of the present invention receives a data packet exceeding a user's access rights from the user.

FIG. 18 is a sequence diagram representing operations in a case where user authentication has been passed but a packet (for example, flow #C), having a destination of a network resource without access rights, is transmitted by the user terminal. In this case also, as shown in FIG. 15, since in the forwarding node 201 a processing rule is set that drops packets (other packets in FIG. 15) which do not match a processing rule that has already been set, the forwarding node 201 drops a received packet (S009 in FIG. 18). Furthermore, by specifying a destination or port as a matching rule of the first processing rule, it is possible to reduce the number of packets for which the control device 300 is requested to set a processing rule, and to drop other packets.

As described above, by an arrangement in which, when an unknown packet is received, a forwarding node is made to drop the packet, and with reception of a communication policy as a trigger, the control device 300 first sets a first processing rule allowing the request itself for setting a processing rule, it is possible to reduce the number of requests to set a processing rule issued by forwarding nodes. As a result, it is possible to reduce the load on the control device accompanying requests to set a processing rule.

Second Exemplary Embodiment

Next, a description is given concerning a second exemplary embodiment of the present invention, in which a modification is added to operations of an authentication device and policy management device of the first exemplary embodiment as described above. Since the present exemplary embodiment can be realized with a configuration that is equivalent to the first exemplary embodiment described above, a description is given below centering on points of difference in operations thereof.

Figure 19:
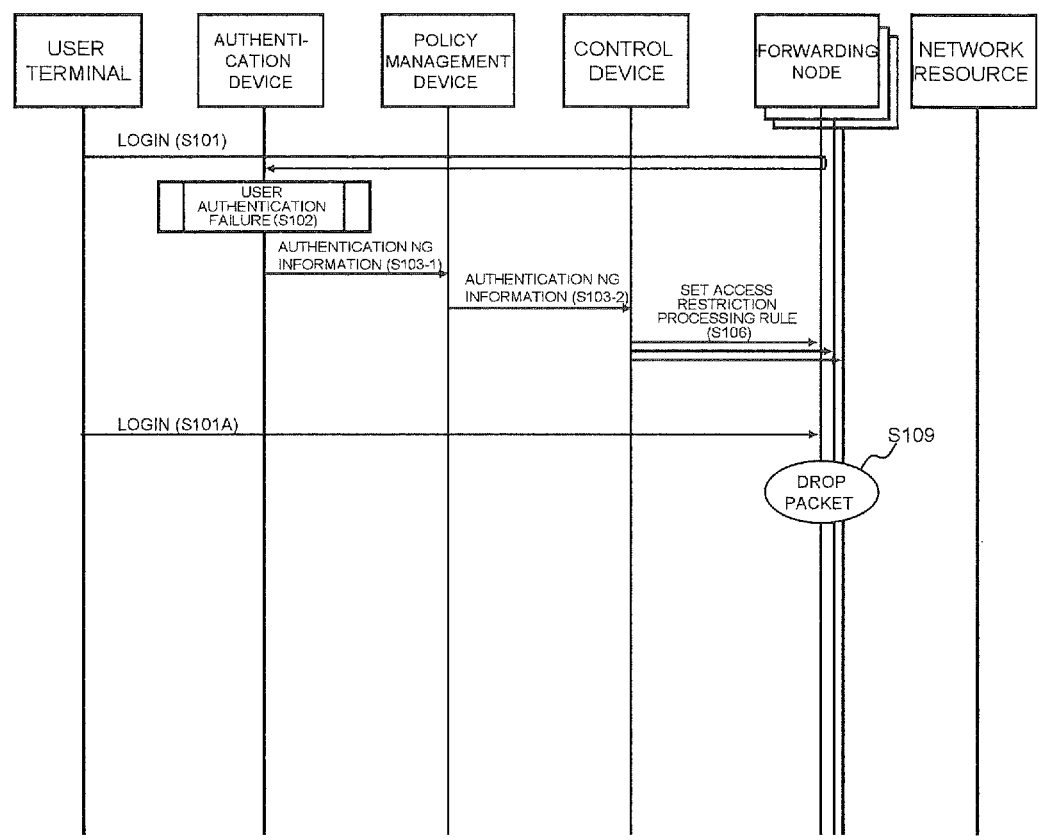
FIG. 19 is a sequence diagram representing operations of a second exemplary embodiment of the present invention.

FIG. 19 is a sequence diagram representing a sequence of operations of the present exemplary embodiment. Operations up to where a user terminal makes a login request to an authentication device 310 (S101 in FIG. 19), and user authentication is performed in the authentication device 310 are similar to the first exemplary embodiment. In the present exemplary embodiment, if user authentication fails (S102 in FIG. 19), the authentication device 310 transmits authentication information (NG) to a policy management device 320 (S103-1 in FIG. 19).

The policy management device 320 that receives the authentication NG information transmits the received authentication NG information to a control device 300 (S103-2 in FIG. 19). Here, information specifying a user terminal for which the authentication has failed (MAC address or information on connected forwarding nodes) is included in the received authentication NG information.

The control device 300 that receives the authentication NG information sets a processing rule for dropping a packet from the user terminal in a forwarding node 201, and also in a forwarding node for which there is a possibility of being connected to the user terminal. It is to be noted that it is desirable to give a higher priority to this processing rule than other processing rules.

Thereafter, when the user terminal transmits a packet to attempt to login again (S101A in FIG. 19), the forwarding node 201 performs processing to drop the packet transmitted from the user terminal (S109 in FIG. 19).

As described above, according to the present exemplary embodiment, in addition to an effect of the first exemplary embodiment described above, it is possible to curtail forwarding to the authentication device 310 of a packet from a user for whom authentication has failed once, and to protect from unauthorized access from a malicious user. Furthermore, in the exemplary embodiment described above a description has been given in which the packet from the user terminal is dropped, but a processing rule may be set, which causes access to a specific server displaying a message that access is not possible to the user terminal. It is to be noted that in the abovementioned description, information of a user (terminal) for which authentication has failed is transmitted, but a communication policy of the first exemplary embodiment described above may be made to hold a flag or the like forbidding setting of a first processing rule, and an instruction may be given to drop a packet from the user terminal.

Third Exemplary Embodiment

Next, a description is given concerning a third exemplary embodiment of the present invention, in which a security function of the first exemplary embodiment described above is strengthened. Since the present exemplary embodiment can be realized with a configuration that is approximately in common with the first exemplary embodiment described above, a description is given below centering on points of difference.

Figure 20:
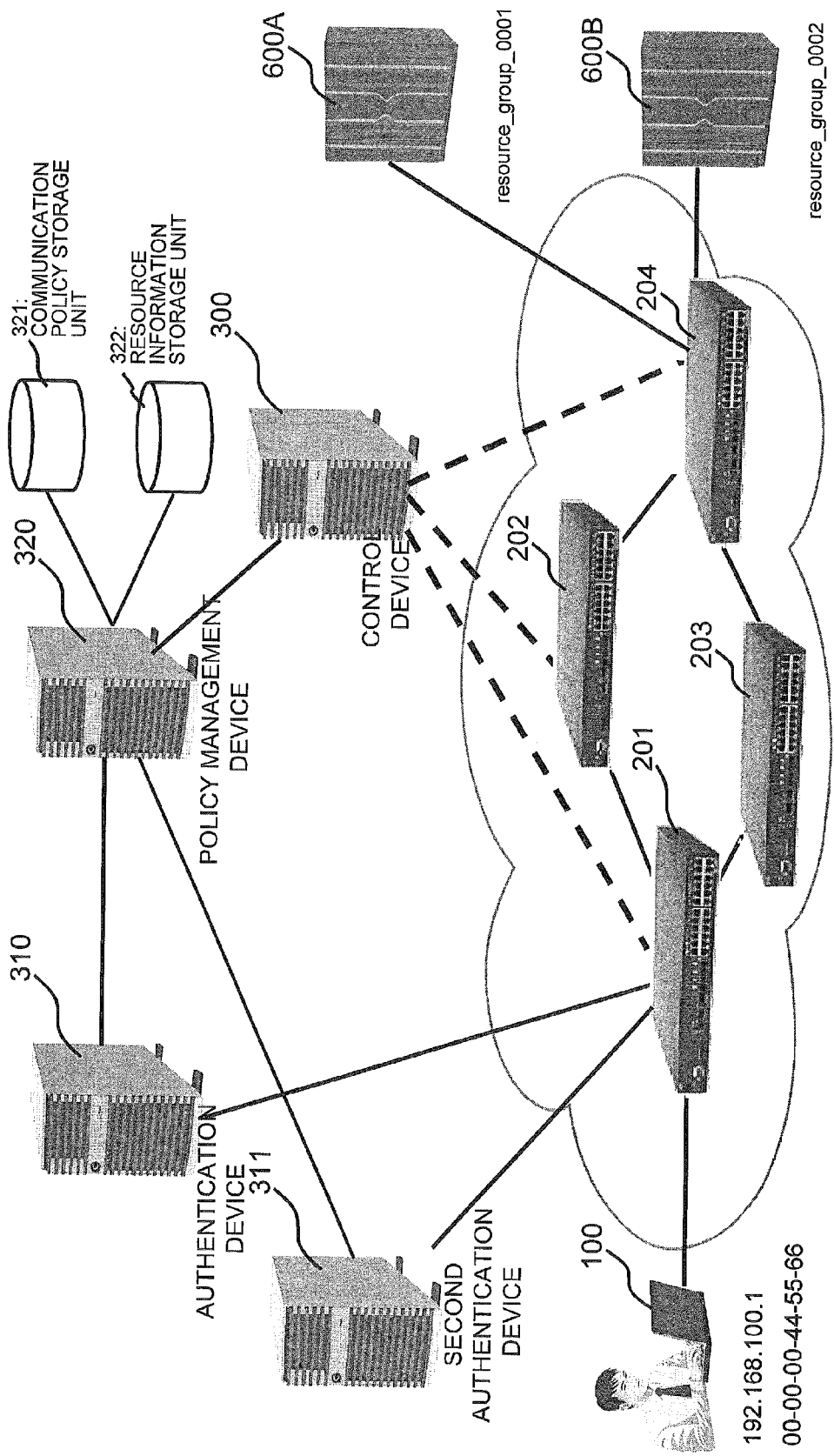
FIG. 20 is a diagram for describing a configuration of a communication system of a third exemplary embodiment of the present invention.

FIG. 20 is a diagram for describing a configuration of a communication system of the third exemplary embodiment of the present invention. A point of difference in the configuration with respect to the first exemplary embodiment represented in FIG. 2 is that a second authentication device 311 is added in parallel to an (first) authentication device 310. The second authentication device 311, similar to the authentication device 310, can transmit a result of user authentication with respect to a user terminal 100 via a forwarding node 201 to a policy management device 320.

Figure 21:
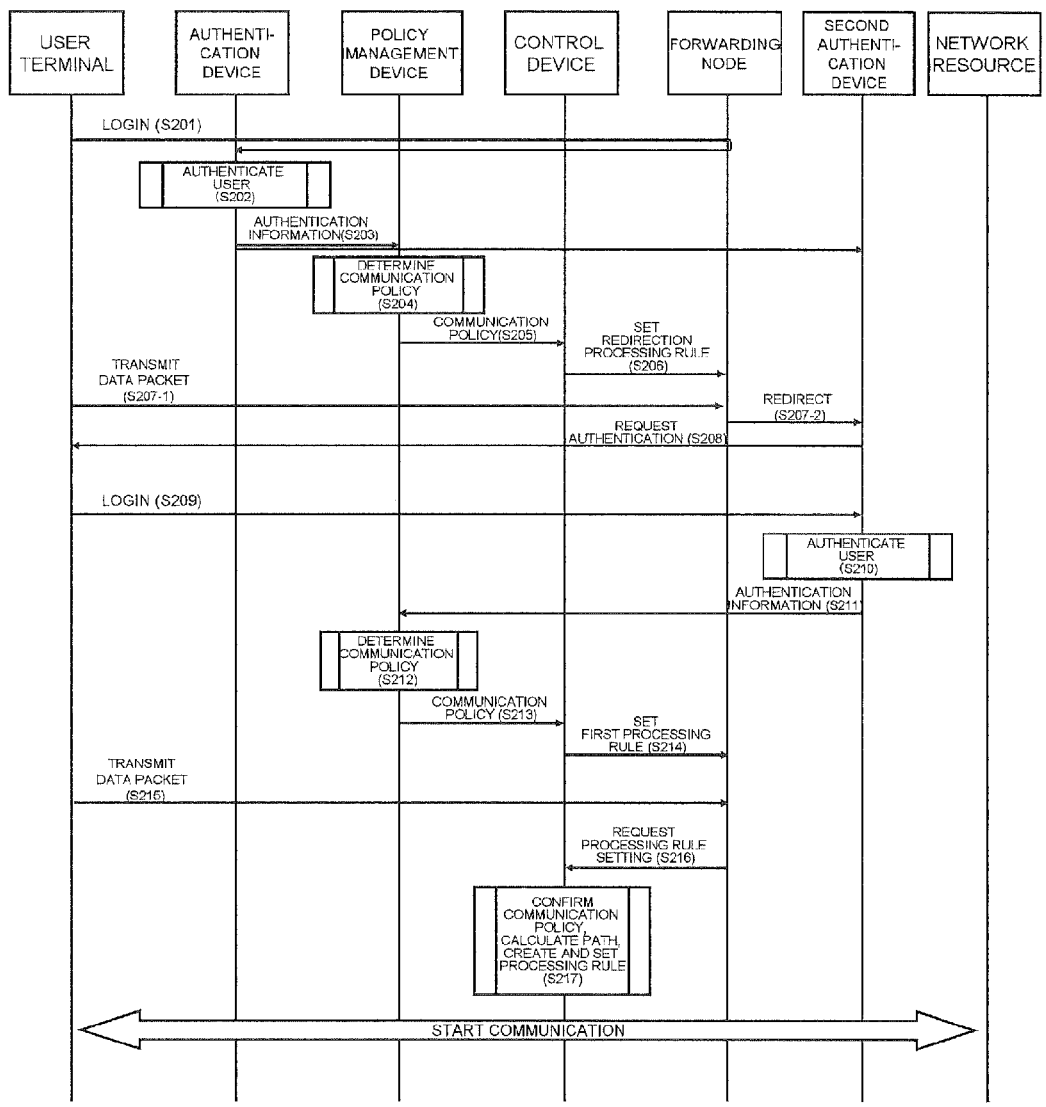
FIG. 21 is a sequence diagram representing operations of the third exemplary embodiment of the present invention.

FIG. 21 is a sequence diagram representing an operation of the third exemplary embodiment of the present invention. The user terminal makes a login request to the authentication device 310 (S201 in FIG. 21), and a user authentication protocol is performed in the authentication device 310 (S202 in FIG. 21). The authentication device 310 transmits a result thereof to a policy management device 320 and the second authentication device 311 (S203 in FIG. 21).

On confirming that a source of authentication information is the authentication device 310, the policy management device 320 generates a communication policy indicating that a user authentication protocol with the authentication device 311 has not been completed by the user terminal, and transmits to a control device 300 (S204 and S205 in FIG. 21).

The control device 300 that receives the communication policy sets to the forwarding node 201 a processing rule redirecting a packet next sent from a user terminal to the second authentication device 311 (S206 in FIG. 21).

Thereafter, on receiving the packet from the user terminal, the forwarding node 201 redirects to the second authentication device 311, in accordance with the processing rule (S207-1 and S207-2 in FIG. 21). The second authentication device 311 makes a request for a user authentication protocol to the user terminal (S208 of FIG. 21).

Thereafter, the user authentication protocol is performed between the user terminal and the authentication device 311 (S209 and S210 in FIG. 21), and a result thereof is transmitted to the policy management device 320 (S211 of FIG. 21).

On confirming that a source of authentication information is the authentication device 311, similar to the first exemplary embodiment, the policy management device 320 refers to a communication policy storage unit 321 and a resource information storage unit 322 based on the received authentication information, determines a communication policy (S212 of FIG. 21), and transmits the policy to the control device 300 (S213 of FIG. 21).

The following operations are similar to the first exemplary embodiment: on receiving the communication policy, the control device 300 sets a first processing rule for making a request for setting of a processing with regard to a packet from a user terminal in a forwarding node 201 (S214 in FIG. 21).

In this way, it is possible to request setting the processing rule for the packet received from the user terminal, and thereafter, based on the packet received from the user terminal a request is made to the control device 300 to set a processing rule (S215 and S216 of FIG. 21), and path calculation and setting of a processing rule are performed in the control device 300 (S217 in FIG. 21).

As described above, according to the present exemplary embodiment, the possibility of a first and second processing rule being set by a malicious user can be further reduced.

It is to be noted that in the third exemplary embodiment described above, a description has been given in which two authentication devices, the authentication devices 310 and 311 are used, but a configuration can also be employed in which 3 or more authentication devices are used. Furthermore, a modified exemplary embodiment can also be employed in which, according to an initial authentication result, a redirection destination is assigned to the second authentication device 311 or other authentication devices.

Furthermore, in the third exemplary embodiment described above, a description has been given in which the policy management device 320 determines whether or not a user authentication protocol with a predetermined plurality of authentication devices has been completed by the user terminal. However, a configuration is also possible in which a table or the like is provided that manages an authentication state of respective users, on the policy management device 320 side. In this way, it is possible to use a method in which, after first performing the user authentication protocol with the authentication device 311, the user authentication protocol with the authentication device 310 is performed. Furthermore, an arrangement is possible in which it is sufficient if management is performed by providing an appropriate period of validity for authentication results obtained from respective authentication devices, and a user authentication protocol is performed with authentication devices for which the period of validity has expired.

Fourth Exemplary Embodiment

Furthermore, in the exemplary embodiment described above a description has been given in which a control device 300 sets a first processing rule in a forwarding node 201. However, an arrangement is possible where the first processing rule is set in a plurality of forwarding nodes. A description is given below concerning a fourth exemplary embodiment in which the control device 300 sets a first processing rule in a plurality of forwarding nodes. Since the present exemplary embodiment can be realized with a configuration that is equivalent to the first exemplary embodiment described above, a description is given below centering on points of difference.

FIG. 22 is an example of communication policy information stored in a communication policy storage unit of the fourth exemplary embodiment of the present invention. A point of difference from the communication policy information stored in the communication policy storage unit of the first exemplary embodiment is that a movement range limitation field indicating a range of possible movement of a user terminal is added.

Figure 23:
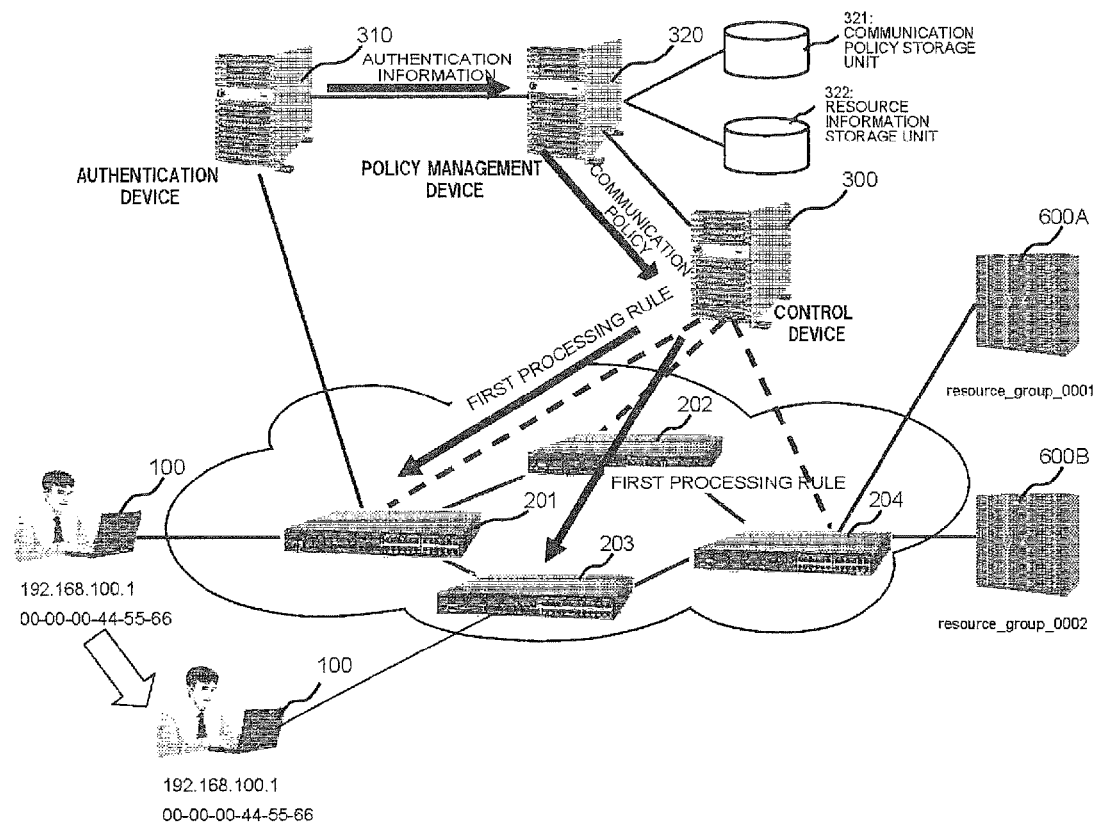
FIG. 23 is a diagram for describing operations of the fourth exemplary embodiment of the present invention.

Overall operations are similar to the first exemplary embodiment described above. However, a policy management device 320, based on communication policy information as described above, gives an instruction to a control device 300 to set a first processing rule in a forwarding node determined in the movement range limitation field, as shown in FIG. 23.

In this way, besides the forwarding node 201, it is possible to set a first processing rule also in a forwarding node to which a connection is possible by the user terminal moving (for example, forwarding node 203 in FIG. 23), and user movement is allowed with limitations. Furthermore, in a case where the user actually moves to these forwarding nodes, it is possible to omit a process from a user authentication protocol (S001 "login" in FIG. 9) up to setting (S006 in FIG. 9) of the first processing rule by the control device 300.

It is to be noted that, as shown in FIG. 22, the number of forwarding nodes set in the movement range limitation field can be appropriately set in accordance with roles or resource groups of respective users. Furthermore, as in FIG. 22, rather than describing a forwarding node for which the first processing rule is set, a distance (number of hops) from a forwarding node to which the user terminal is presently connected may be specified in the movement range limitation field, and the first processing rule may be set in a forwarding node that is in a fixed distance range, in a network topology.

A description has been given above of preferred exemplary embodiments of the present invention, but the invention is not limited to the abovementioned exemplary embodiments, and further modifications, substitutions, and adjustments can be added within a scope that does not depart from a fundamental technological concept of the present invention. For example, in the respective exemplary embodiments described above, a description has been given in which the control device 300, the authentication device 310, the policy management device 320, the communication policy storage unit 321, and the resource information storage unit 322 are each provided independently, but it is also possible to use a configuration in which these are consolidated as appropriate.

Furthermore, in the exemplary embodiments described above, a description has been given in which a communication policy is used with information as to whether or not access is possible as a main constituent, as in FIG. 6. However, it is also possible to include information such as communication attributes such as QoS or the like, forwarding nodes that can be used in a path, a period of time in which access is possible, and the like, in the communication policy. By using this type of communication policy to generate the first processing rule, it is possible to finely set a range and time in which a request can be made to the control device to set a processing rule. Besides timing at which the policy management device 320 gives a notification of the communication policy to the control device 300 being directly after user authentication, the policy management device 320 may update the communication policy according to time, user location, or the like, and re-notify the control device 300. Furthermore, a mode is also possible in which detailed control content such as the time, the user location, and the like is included in the communication policy itself, and detailed setting, modification and deletion of the first and second processing rules are performed on the control device 300 side.

In addition, in the exemplary embodiment described above, a description has been given in which a role ID is given to a user as shown in FIG. 3 to FIG. 6 to perform access control. However, it is also possible to perform access control by using a user ID given to each user, an access ID such as a MAC address, location information of the user terminal 100, and the like.

Furthermore, in the exemplary embodiments described above, a description has been given in which the control device 300 generates and sets the second processing with regard to a packet for which a request is received to set a processing rule, based on the first processing rule. However, it is also possible for the control device 300, with reception of a request for setting of a processing rule as a trigger, to refer to the communication policy and to compute a path to all access destinations allowed for a user, and to set processing rules realizing these paths in advance. By so doing, it is possible to further curtail the frequency of occurrence of requests to set a processing rule.

In addition, in the exemplary embodiment described above, a description has been given in which the user terminal 100 performs an authentication protocol with the authentication device 310 via the forwarding node 201. However, it is also possible to use a configuration in which the user terminal 100 communicates directly with the authentication device 310, and implements the authentication protocol.

It is to be noted that entire disclosures of the abovementioned Patent Literatures and non-Patent Literatures are incorporated herein by reference. Modifications and adjustments of exemplary embodiments are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

11 node communication unit
12 control message processing unit
13 processing rule management unit
14 processing rule storage unit
15 forwarding node management unit
16 path and action calculating unit
17 topology management unit
18 terminal location management unit
19 communication policy management unit
20 communication policy storage unit
100 user terminal
200A, 200B, 201 to 204 forwarding node (network node)
300 control device
301 setting request transmission permitting unit
302 path control unit
310, 311 authentication device
320 policy management device
321 communication policy storage unit
322 resource information storage unit
600, 600A, 600B network resource

The invention claimed is:

1. A communication system, comprising:
a control device;
a forwarding node that processes, in accordance with a processing rule set by the control device, a packet transmitted from a user terminal; and
a policy management device that manages a communication policy and notifies the control device of a communication policy that corresponds to a user for whom authentication has succeeded,
wherein the control device further comprises:
a setting request transmission permitting unit that, based on the notification from the policy management device, sets to a forwarding node that receives a packet from the user terminal a first processing rule causing the forwarding node to make a setting request of a processing rule with regard to a packet transmitted from the user terminal; and
a path control unit that, in a case of receiving the setting request from a forwarding node to which the first processing rule is set, determines a path from the user terminal to an access destination in accordance with the communication policy, and sets to a forwarding node along the path a second processing rule that corresponds to the path.

2. The communication system according to claim 1, wherein:
the communication policy includes a policy of generating for the first processing rule a matching rule that identifies a packet for which a setting request of a processing rule is allowed; and
the setting request transmission permitting unit refers to the communication policy, and, in a case of receiving a packet that matches the matching rule from the user terminal, sets a first processing rule that causes a setting request of a processing rule to the control device.

3. The communication system according to claim 1, wherein:
the communication policy includes information of a resource that is accessible by the user, or a resource that is inaccessible by the user; and
the path control unit sets the second processing rule, in a case where a destination of a packet related to a setting request of a processing rule received from the forwarding node is a destination that is accessible by the user.

4. The communication system according to claim 1, wherein:
the policy management device further notifies the control device that a user, for whom authentication has failed, is detected; and
the control device, based on the notification, sets to a predetermined forwarding node a processing rule that prevents forwarding of a packet from the user to a predetermined authentication device.

5. The communication system according to claim 1, wherein
a notification is given to the control device as to whether or not a user authentication procedure against all predetermined authentication devices is completed, and
the control device, in a case where a communication policy received from the policy management device indicates that a user authentication procedure against all predetermined authentication devices is not completed, sets to a predetermined forwarding node a processing rule that causes the predetermined forwarding node to start a user authentication procedure between the user and a predetermined authentication device.

6. The communication system according to claim 1, wherein:
the communication policy includes information for determining a forwarding node, to which the first processing rule is to be set; and
the setting request transmission permitting unit refers to the communication policy to set the first processing rule to a plurality of forwarding nodes.

7. A control device, that is connected to:
a forwarding node that processes, in accordance with a processing rule set by the control device, a packet transmitted from a user terminal; and
a policy management device that manages a communication policy and notifies the control device of a communication policy that corresponds to a user for whom authentication has succeeded, wherein the control device comprises:
a setting request transmission permitting unit that, based on the notification from the policy management device, sets to a forwarding node that receives a packet from the user terminal a first processing rule causing the forwarding node to make a setting request of a processing rule with regard to a packet transmitted from the user terminal; and
a path control unit that, in a case of receiving the setting request from a forwarding node to which the first processing rule is set, determines a path from the user terminal to an access destination in accordance with the communication policy, and sets to a forwarding node along the path a second processing rule that corresponds to the path.

8. The control device according to claim 7, wherein:
the communication policy includes a policy of generating a matching rule that identifies a packet, to which processing content prescribed in the first processing rule is applied; and
the setting request transmission permitting unit refers to the communication policy, and, in a case of receiving a packet that matches the matching rule from the user terminal, sets a first processing rule that causes a setting request of a processing rule to the control device.

9. The control device according to claim 7, wherein:
the communication policy includes information of a resource that is accessible by the user, or a resource that is inaccessible by the user; and
the path control unit sets the second processing rule, in a case where a destination of a packet related to a setting request of a processing rule received from the forwarding node is a destination that is accessible by the user.

10. The control device according to claim 7, wherein
in a case where the control device receives from the policy management device a notification that a user, for whom authentication has failed, is detected, the control device sets to a predetermined forwarding node a processing rule that prevents forwarding of a packet from the user to a predetermined authentication device.

11. The control device according to claim 7, wherein
in a case where a communication policy received from the policy management device indicates that a user authentication procedure against all predetermined authentication devices is not completed, the control device sets to a predetermined forwarding node a processing rule that causes the predetermined forwarding node to start a user authentication procedure between the user and a predetermined authentication device.

12. The control device according to claim 7, wherein:
the communication policy includes information for determining a forwarding node, to which the first processing rule is to be set; and
the setting request transmission permitting unit refers to the communication policy to set the first processing rule to a plurality of forwarding nodes.

13. A policy management device that provides the control device of claim 7 with a communication policy that corresponds to a user for whom authentication has succeeded.

14. A communication method, comprising:
using a control device connected to:
a forwarding node that processes, in accordance with a processing rule set by the control device, a packet transmitted from a user terminal; and
a policy management device that manages a communication policy and notifies the control device of a communication policy that corresponds to a user for whom authentication has succeeded, wherein the communication method further comprises:
based on the notification from the policy management device, setting to a forwarding node that receives a packet from the user terminal a first processing rule causing the forwarding node to make a setting request of a processing rule with regard to a packet transmitted from the user terminal; and
in a case of receiving the setting request from a forwarding node for which the first processing rule is set, determining a path from the user terminal to an access destination in accordance with the communication policy, and setting to a forwarding node along the path a second processing rule that corresponds to the path.

15. A non-transient computer-readable storage medium storing a program that causes a computer comprising included in a control device connected to:
a forwarding node that processes, in accordance with a processing rule set by the control device, a packet transmitted from a user terminal; and
a policy management device that manages a communication policy and notifies the control device of a communication policy that corresponds to a user for whom authentication has succeeded, to execute:
based on the notification from the policy management device, setting to a forwarding node that receives a packet from the user terminal a first processing rule causing the forwarding node to make a setting request of a processing rule with regard to a packet transmitted from the user terminal; and
in a case of receiving the setting request from a forwarding node for which the first processing rule is set, determining a path from the user terminal to an access destination in accordance with the communication policy, and setting to a forwarding node along the path a second processing rule that corresponds to the path.

16. The communication method according to claim 14, wherein:
the communication policy includes a policy of generating a matching rule that identifies a packet, to which processing content prescribed in the first processing rule is applied; and
the communication method comprises referring to the communication policy, and, in a case of receiving a packet that matches the matching rule from the user terminal, setting a first processing rule that causes a setting request of a processing rule to the control device.

17. The communication method according to claim 14, wherein:
the communication policy includes information of a resource that is accessible by the user, or a resource that is inaccessible by the user; and
the communication method comprises setting the second processing rule, in a case where a destination of a packet related to a setting request of a processing rule received from the forwarding node is a destination that is accessible by the user.

18. The non-transient computer-readable storage medium according to claim 15, wherein:
the communication policy includes a policy of generating a matching rule that identifies a packet, to which processing content prescribed in the first processing rule is applied; and
the program causes the computer to execute referring to the communication policy, and, in a case of receiving a packet that matches the matching rule from the user terminal, setting a first processing rule that causes a setting request of a processing rule to the control device.

19. The non-transitory computer-readable storage medium according to claim 15, wherein:
the communication policy includes information of a resource that is accessible by the user, or a resource that is inaccessible by the user; and
the program causes the computer to execute setting the second processing rule, in a case where a destination of a packet related to a setting request of a processing rule received from the forwarding node is a destination that is accessible by the user.

20. The communication system according to claim 1, wherein if a communication policy received from the policy management device indicates that a user authentication procedure against all predetermined authentication devices is not completed, then the control device sets to a processing rule that causes a predetermined forwarding node to start a user authentication procedure between the user and a predetermined authentication device.

* * * * *